(12) United States Patent
Gong

(10) Patent No.: US 12,103,895 B2
(45) Date of Patent: *Oct. 1, 2024

(54) PROCESSES AND SYSTEMS FOR CARBON DIOXIDE SEQUESTRATION AND RELATED CONCRETE COMPOSITIONS

(71) Applicant: CRH Group Services Limited, Dublin (IR)

(72) Inventor: Bill Gong, Markham (CA)

(73) Assignee: CRH GROUP SERVICES LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/404,861

(22) Filed: Aug. 17, 2021

(65) Prior Publication Data

US 2021/0380494 A1 Dec. 9, 2021

Related U.S. Application Data

(63) Continuation of application No. 17/131,578, filed on Dec. 22, 2020, now Pat. No. 11,124,459, which is a continuation of application No. PCT/CA2019/050922, filed on Jul. 4, 2019.

(60) Provisional application No. 62/693,962, filed on Jul. 4, 2018.

(51) Int. Cl.
| | |
|---|---|
| *C04B 40/02* | (2006.01) |
| *B28C 5/42* | (2006.01) |
| *C04B 14/06* | (2006.01) |
| *C04B 14/28* | (2006.01) |
| *C04B 28/08* | (2006.01) |

(52) U.S. Cl.
CPC ........ *C04B 40/0231* (2013.01); *B28C 5/4231* (2013.01); *C04B 14/06* (2013.01); *C04B 14/28* (2013.01); *C04B 28/082* (2013.01)

(58) Field of Classification Search
CPC ..... C04B 40/0231; C04B 14/06; C04B 14/28; C04B 28/082; C04B 22/10; C04B 2111/00017; C04B 28/04; B28C 5/4231; B28C 7/02; B28C 7/0404; B28C 9/002; Y02P 40/18; Y02W 30/91
See application file for complete search history.

(56) References Cited

U.S. PATENT DOCUMENTS

| | | |
|---|---|---|
| 3,976,445 A | 8/1976 | Douglas |
| 5,232,496 A | 8/1993 | Jennings et al. |
| 6,264,736 B1 | 7/2001 | Knopf et al. |
| 8,137,444 B2 | 3/2012 | Farsad et al. |
| 8,272,205 B2 | 9/2012 | Estes et al. |
| 8,470,275 B2 | 6/2013 | Constantz et al. |
| 8,845,940 B2 | 9/2014 | Niven et al. |
| 9,108,883 B2 | 8/2015 | Forgeron et al. |
| 9,376,345 B2 | 6/2016 | Forgeron et al. |
| 9,388,072 B1 | 7/2016 | Niven et al. |
| 9,463,580 B2 | 10/2016 | Forgeron et al. |
| 9,492,945 B2 | 11/2016 | Niven et al. |
| 9,738,562 B2 | 8/2017 | Monkman et al. |
| 9,758,437 B2 | 9/2017 | Forgeron et al. |
| 9,790,131 B2 | 10/2017 | Lee et al. |
| 10,350,787 B2 | 7/2019 | Forgeron et al. |
| 10,246,379 B2 | 9/2019 | Niven et al. |
| 10,570,064 B2 | 2/2020 | Monkman et al. |
| 10,654,191 B2 | 5/2020 | Niven et al. |
| 10,683,237 B2 | 6/2020 | Lee et al. |
| 10,927,042 B2 | 2/2021 | Monkman et al. |
| 11,124,459 B2 * | 9/2021 | Gong ............... C04B 14/06 |
| 11,660,779 B2 | 5/2023 | Monkman et al. |

(Continued)

FOREIGN PATENT DOCUMENTS

| | | |
|---|---|---|
| CA | 2211991 C | 2/2006 |
| CA | 2755534 A1 | 4/2013 |

(Continued)

OTHER PUBLICATIONS

U.S. Appl. No. 17/131,578, Non-Final Office Action, dated Feb. 8, 2021, 12 pages.

(Continued)

*Primary Examiner* — Anthony J Green
(74) *Attorney, Agent, or Firm* — Kilpatrick Townsend & Stockton LLP

(57) ABSTRACT

A ready-mixed composition and a pre-mix composition for the production of a concrete material containing sequestered carbon dioxide, a $CO_2$-containing water used in such compositions, dry-batch and wet-batch processes for sequestering carbon dioxide in concrete material, general method and process for sequestering carbon dioxide in hardening concrete, system and ready-mixed truck to perform such processes and methods for the production of a ready-to-cure carbonated concrete. Compositions comprise a concrete mixture and a $CO_2$-containing water. The $CO_2$-containing water comprising water and at least one of blended $CO_2$ gas bubbles, dissolved $H_2CO_3$, carbonate ions ($CO_3^{2-}$), bicarbonate ions ($HCO^{3-}$), nanosized alkaline earth metal carbonate and nanosized alkali metal carbonate particles. The concrete mixture comprises a cementitious material, aggregates and at least one $CO_2$-sequestering chemical for accelerating a $CO_2$ sequestration speed and maximizing the captured amount of the carbon dioxide.

17 Claims, 20 Drawing Sheets

(56) References Cited

U.S. PATENT DOCUMENTS

| | | |
|---|---|---|
| 11,773,019 B2 | 10/2023 | Monkman et al. |
| 11,773,031 B2 | 10/2023 | Forgeron et al. |
| 2007/0171764 A1 | 7/2007 | Klein et al. |
| 2007/0266905 A1 | 11/2007 | Amey et al. |
| 2010/0086983 A1 | 4/2010 | Gellett et al. |
| 2011/0289901 A1 | 12/2011 | Estes et al. |
| 2012/0290208 A1 | 11/2012 | Jiang et al. |
| 2012/0293011 A1 | 11/2012 | Byun et al. |
| 2014/0197563 A1 | 7/2014 | Niven et al. |
| 2014/0216303 A1 | 8/2014 | Lee et al. |
| 2015/0345034 A1 | 12/2015 | Sundra et al. |
| 2016/0107939 A1 | 4/2016 | Monkman et al. |
| 2016/0340253 A1 | 11/2016 | Forgeron et al. |
| 2018/0022654 A1 | 1/2018 | Forgeron et al. |
| 2018/0029934 A1 | 2/2018 | Monkman et al. |
| 2018/0118622 A1 | 5/2018 | Monkman et al. |
| 2018/0258000 A1 | 9/2018 | Lee et al. |
| 2019/0077045 A1 | 3/2019 | Monkman et al. |
| 2019/0168416 A1 | 6/2019 | Monkman et al. |
| 2020/0165170 A1 | 5/2020 | Niven et al. |
| 2020/0223760 A1 | 7/2020 | Monkman et al. |
| 2020/0282595 A1 | 9/2020 | Monkman et al. |
| 2022/0001578 A1 | 1/2022 | Forgeron et al. |
| 2022/0013196 A1 | 1/2022 | Monkman et al. |
| 2022/0065527 A1 | 3/2022 | Forgeron et al. |
| 2022/0194852 A1 | 6/2022 | Thomas et al. |
| 2023/0212085 A1 | 7/2023 | Monkman et al. |

FOREIGN PATENT DOCUMENTS

| | | | |
|---|---|---|---|
| CA | 2979471 | | 12/2014 |
| CA | 2945060 | | 10/2015 |
| CA | 2968246 | | 6/2016 |
| CA | 2821776 | C | 8/2016 |
| CH | 584666 | A5 | 2/1977 |
| CN | 102745931 | | 10/2012 |
| DE | 102016001791 | | 8/2017 |
| EP | 1785245 | A1 | 5/2007 |
| JP | H11324324 | A | 11/1999 |
| WO | 2008148055 | | 12/2008 |
| WO | 2011081681 | | 7/2011 |
| WO | 2014039578 | | 3/2014 |
| WO | WO-2014205577 | A1 * | 12/2014 ........ B01F 15/00136 |
| WO | 201777324 | A1 | 5/2017 |
| WO | 2020006636 | | 1/2020 |
| WO | 2021071980 | A1 | 4/2021 |
| WO | 2022090796 | A1 | 5/2022 |
| WO | 2022195540 | A1 | 9/2022 |
| WO | 2023064403 | A1 | 4/2023 |

OTHER PUBLICATIONS

U.S. Appl. No. 17/131,578 , Notice of Allowance, dated May 18, 2021, 7 pages.

Application No. PCT/CA2019/050922 , International Search Report and Written Opinion, dated Sep. 5, 2019, 18 pages.

Owens, K.J., et al." Utilisation of Carbon Dioxide from Flue Gases to Improve Physical and Microstructural Properties of Cement and Concrete Systems", Proceedings of 1st International Conference: Sustainable Construction Materials and Technologies, 2007, 10 pages.

Kwasny Jacek, et al., "CO2 Sequestration in Cement-Based Materials During Mixing Process Using Carbonated Water and Gaseous CO2", 4th International Conference on the Durability of Concrete Structures, Jul. 24-26, 2014, pp. 72-78.

Monkman, Sean, et al., "Case Studies of CO2 Utilization in Concrete", International Concrete Institute, Sypmposium papers, vol. 303, Available at : https://www.concrete.org/publications/internationalconcreteabstractsportal/m/details/id/51688123. Jun. 1, 2015, 4 pages.

Andre, Joel, "Mixing Cement With Carbon Dioxide-Effect On Early Hydration", Bachelor of Science Thesis, Chalmers University of Technology, Department of Chemistry and Chemical Engineering, 2017, 38 pages.

He, Zhen, et al., "Effect of Carbonation Mixing on CO 2 Uptake and Strength Gain in Concrete", ournal of Materials in Civil Engineering 29.10, 2017, 8 pages.

Monkman, Sean, et al., "Activation of Cement Hydration with Carbon Dioxide", Journal of Sustainable Cement-Based Materials, 7.3, 2018, pp. 160-181, Abstract, pp. 1-7.

Qian, Xin, et al., "Carbon dioxide as an admixture for better performance of OPC-based concrete." Journal of CO2 Utilization 25, 2018, pp. 1-29.

Abunqira, Imad Juma Mohammad, "Removal of Selected Heavy Metals from Wash Water Generated from Ready-Mix Concrete Trucks, Dubai, UAE", Available at https://scholarworks.uaeu.ac.ae/all_theses/389, Theses, 389, 2008, pp. 1-104.

Low, G.L., et al., "Use Of Recycled Cement-Based Slurry Water For Making Concrete", Journal - The Institution of Engineers, Malaysia, vol. 68, No. 4, Available at http://dspace.unimap.edu.my/bitstream/handle/123456789/13617/047-055_Recycled%20cement%202pp.pdf?sequence=1, Dec. 2007, pp. 47-55.

Berger, R. L., et al., "Acceleration of hydration of calcium silicates by carbon dioxide treatment", Nature Physical Science 240, Issue 97, Nov. 1972, pp. 16-18, Abstract, pp. 1-6.

Shao, Yixin, et al. "Accelerated Carbonation of Portland Limestone Cement", Journal of Materials in Civil Engineering, vol. 26, Issue 1, Jan. 2014, pp. 117-124.,.

Klemm, W. A., et al., "Accelerated Curing of Cementitious Systems by Carbon Dioxide: Part I. Portland Cement." Cement and Concrete Research 2.5, 1972, pp. 567-576, Abstract, pp. 1-5.

Monkman, Sean, et al., "Properties and Durability of Concrete Produced Using CO2 as an Accelerating Admixture", Cement and Concrete Composites vol. 74, Nov. 2016, 7 pages.

Monkman, Sean et al. "The Durability of Concrete Produced Using CO2 as an Admixture", Fourth International Conference on Sustainable Construction Materials and Technologies, 2016, 10 pages.

Monkman, Sean, "Sustainable Ready Mixed Concrete Production Using Waste CO2: A Case Study" American Concrete, Institute 330, 2018, pp. 163-174.

Monkman, Sean, et al., "On the mechanism of using carbon dioxide as a beneficial concrete admixture", SP 329 Proceedings, 2018, pp. 415-428.

Goodbrake, C.J., et al., "Reaction of Beta-Dicalcium Silicate and Tricalcium Silicate with Carbon Dioxide and Water Vapor", Journal of the American Ceramic Society, vol. 62, Issue 3-4, Mar. 1979, pp. 168-171.

Moorehead, D.R., "Cementation by the Carbonation of Hydrated Lime", Cement and Concrete Research, vol. 16, No. 5, Jun. 1986, pp. 700-708.

Bertos, Fernandez M., et al., A review of Accelerated Carbonation Technology in the Treatment of Cement-Based Materials and Sequestration of CO2, Journal of Hazardous Materials, vol. 112, 2004, pp. 193-205.

United States Department of the Interior Bureau of Reclamation, "Experiments with Dry Ice for Cooling Fresh Concrete", Concrete Laboratory Report No. C-661, Engineering Laboratories Branch, Dec. 22, 1952, pp. 1-10.

* cited by examiner

PROCESSES AND SYSTEMS FOR CARBON DIOXIDE SEQUESTRATION AND RELATED CONCRETE COMPOSITIONS

CROSS-REFERENCE TO RELATED APPLICATIONS

This is a Continuation of U.S. application Ser. No. 17/131,578, filed on Dec. 22, 2020, now issued as U.S. Pat. No. 11,124,459, which is a continuation of PCT Application No. PCT/CA2019/050922, filed Jul. 4, 2019, and published on Jan. 9, 2020 as International Publication No. WO 2020/006636 A1, which application claims priority to and the benefit of U.S. Provisional Application No. 62/693,962, filed on Jul. 4, 2018, the contents of all which are incorporated herein by reference in their entireties.

TECHNICAL FIELD

The present invention generally relates to concrete production, and more particularly to the capture of $CO_2$ within concrete via tailored compositions, processes and systems.

BACKGROUND

Cement production is known to be third-largest source of anthropogenic emissions of carbon dioxide ($CO_2$). $CO_2$ is a by-product of the decomposition of carbonates for example during the production of clinker, a component of cement, in which limestone ($CaCO3$) is converted to lime ($CaO$) by addition of heat. $CO_2$ is further emitted during cement production by fossil fuel combustion. Considering the negative impacts of such $CO_2$ emissions, concrete may be seen as a carbon sink that contributes to the carbon dioxide re-absorption cycle.

It is known that ambient $CO_2$ is naturally absorbed by concrete, which is referred to as carbonation of concrete and results in lowering of the pH in the portion of the concrete where significant amounts of $CO_2$ have been absorbed. This change in pH can lead to corrosion of internal reinforcing structures that may be present within the concrete. Additionally, in certain concrete types such as concrete including Supplementary Cementitious Materials and referred to as SCM concrete, the carbonation further results in increased concrete porosity due to precipitation of calcium carbonate on the surface of the anhydrite cement particles and its hydration products. However, in concrete made of ordinary Portland cement (OPC), carbonation takes mostly place in solution in the pores of the forming concrete, thereby forming calcium carbonate within the pores that densifies the concrete microstructure. Carbonation can possibly enhance certain properties of the concrete including strength development.

Some ways of producing carbonated concrete include providing an initial amount of CO2 into the concrete at an early production stage thereof.

For example, liquefied $CO_2$ may be injected directly in a ready-mixed truck during mixing of the batched concrete ingredients, such that $CO_2$ reacts with calcium ions released from cement to form solid calcium carbonate particles. In another example, freshly mixed concrete may be exposed to a stream of highly concentrated gaseous $CO_2$. Some known and available technologies are limited to injection of low-concentrated $CO_2$ (less than 1 kg/m$^3$) into the concrete mix. $CO_2$ may be also sprayed on the surface of fresh concrete but spraying can result in the accumulation and uneven distribution of calcium carbonate in the concrete microstructure.

In addition, spraying $CO_2$ can result in excessive loss in the atmosphere due to limited space above the concrete inside the drum of a ready-mix truck especially at high injection speeds.

Sequestration of $CO_2$ within concrete presents various challenges that need to be addressed. Modification of cement hydration process due to carbonation may impact negatively on concrete performance. There is still a need for improvements in controlling chemical reactions involving $CO_2$ and concrete ingredients, for enhancing $CO_2$ sequestration while providing desirable properties to the resulting concrete.

SUMMARY

The techniques described herein include a ready-mixed composition and a pre-mix composition for the production of a concrete material containing sequestered carbon dioxide, a $CO_2$-containing water used in such compositions, dry-batch and wet-batch processes for sequestering carbon dioxide in concrete material, and general method and process for sequestering carbon dioxide in hardening concrete. Specific systems and devices to perform such processes and methods have been developed including a system for the production of a wet carbonated concrete mixture and a ready-mixed truck for the production of the ready-mixed composition.

The present techniques make use of a $CO_2$-containing water comprising water and at least one of blended $CO_2$ gas bubbles, dissolved $H_2CO_3$, carbonate ions ($CO_3^{2-}$), bicarbonate ions ($HCO^{3-}$), nanosized alkaline earth metal carbonate and nanosized alkali metal carbonate particles. Related processes and methods to produce the carbonated concrete are controlled such that cementitious material, water and carbon compounds ($CO_2$ or compounds derived from $CO_2$ equilibrium in water) simultaneously come into contact and are mixed, so as to favor specific chemical reactions leading to enhancing the strength of the resulting carbonated concrete. At least one $CO_2$-sequestering chemical can be added to the cementitious material to offer carbonation candidates, thereby favoring cement hydration products.

More particularly, in a first aspect, there is provided a ready-mixed composition for the production of a concrete material containing sequestered carbon dioxide ($CO_2$), the ready-mixed composition comprising:

a concrete mixture comprising a cementitious material, aggregates and at least one $CO_2$-sequestering chemical for accelerating a $CO_2$ sequestration speed and maximizing the captured amount of the carbon dioxide; and $CO_2$-containing water comprising water and at least one of blended $CO_2$ gas bubbles, dissolved $H_2CO_3$, carbonate ions ($CO_3^{2-}$), bicarbonate ions ($HCO^{3-}$), nanosized alkaline earth metal carbonate and nanosized alkali metal carbonate particles;

wherein the $CO_2$-containing water is mixed with the concrete mixture in conditions allowing workability of the ready-mixed composition.

In another aspect, there is provided a pre-mix composition for the production of a concrete material containing sequestered carbon dioxide ($CO_2$), the ready-mixed composition comprising:

a concrete mixture comprising a cementitious material, aggregates and at least one $CO_2$-sequestering chemical for accelerating a $CO_2$ sequestration speed and maximizing the captured amount of the carbon dioxide; and $CO_2$-containing water comprising water and at least one of blended $CO_2$ gas bubbles, dissolved $H_2CO_3$, carbonate ions ($CO_3^{2-}$), bicarbonate ions ($HCO^{3-}$), nanosized alkaline earth metal carbonate and nanosized alkali metal carbonate particles;

the $CO_2$-containing water being mixable with the concrete mixture to produce a ready-mixed composition.

In another aspect, there is also provided a $CO_2$-containing water containing dissolved and/or blended $CO_2$ having a $CO_2$ to water ratio between 2 g/L (resulting to about 0.3 kg of $CO_2$ per m$^3$ of concrete) to 100 g/L (resulting to about 15.5 kg of $CO_2$ per m$^3$ of concrete), optionally 5 g/L (resulting to about 0.78 kg of $CO_2$ per m$^3$ of concrete) to 80 g/L (resulting to about 12.4 kg of $CO_2$ per m$^3$ of concrete), for reaction with $MA^{a+}$ ions from a concrete mixture for the preparation of carbonated concrete, the $MA^{a+}$ ions being at least one of an alkali metal ion and an alkaline metal earth ion, and the concrete mixture comprising cementitious material, aggregates and at least one $CO_2$-sequestering chemical. There is also provided a $CO_2$-containing water containing dissolved and/or blended $CO_2$ including at least 1 kg of $CO_2$ per m$^3$, for reaction with $MA^{a+}$ ions from a concrete mixture for the preparation of carbonated concrete, the $MA^{a+}$ ions being at least one of an alkali metal ion and an alkaline metal earth ion, and the concrete mixture comprising cementitious material, aggregates and at least one $CO_2$-sequestering chemical.

In another aspect, there is also provided a process for the preparation of a carbonated concrete material, the process comprising the steps of:

mixing a concrete mixture with a $CO_2$-containing water to produce a wet concrete mixture, the mixing being performed in mixing conditions allowing workability of the wet concrete mixture;

conditioning the wet concrete mixture to produce a ready-to-cure concrete;

allowing the ready-to-cure concrete to harden in curing conditions and produce the carbonated concrete material upon hydration and carbonation of the cementitious material;

wherein the concrete mixture comprises a cementitious material, aggregates, and at least one $CO_2$-sequestering chemical releasing species which are ready to be carbonated by the dissolved carbon dioxide and produce nanosized carbonate particles, thereby maximizing hydration and hardening of the cementitious material and maximizing the captured amount of $CO_2$ in the ready-to-cure concrete; and wherein the $CO_2$-containing water comprises water and at least one of blended $CO_2$ gas bubbles, dissolved $H_2CO_3$, carbonate ions ($CO_3^{2-}$), bicarbonate ions ($HCO^{3-}$), nanosized alkaline earth metal carbonate and nanosized alkali metal carbonate particles.

In another aspect, there is provided a method of sequestering carbon dioxide in hardening concrete, the method comprising:

feeding carbon dioxide into water for dissolution and/or blending thereof to produce a $CO_2$-containing water comprising carbon-based compounds;

preparing a concrete mixture by mixing a cementitious material aggregates, and at least one $CO_2$ sequestering chemical;

mixing the $CO_2$-containing water with the concrete mixture to induce hydration reactions of the cementitious material and the $CO_2$ sequestering chemical with water, and carbonation reactions of the cementitious material and the $CO_2$ sequestering chemical with the carbon-based compounds, thereby sequestering carbon dioxide into the hardening concrete;

wherein the at least one $CO_2$-sequestering chemical is selected to mitigate the carbonation reactions of the cementitious material by releasing carbonatable species.

In another aspect, there is provided a wet-batch process for sequestering carbon dioxide ($CO_2$) in concrete material, the process comprising the steps of:

mixing a concrete mixture with a $CO_2$-containing water in a stationary mixer of a central plant to produce a ready-mixed composition, the concrete mixture comprising a cementitious material and aggregates, and the $CO_2$-containing water comprising water and at least one of blended $CO_2$ gas bubbles, dissolved $H_2CO_3$, carbonate ions ($CO_3^{2-}$), bicarbonate ions ($HCO^{3-}$), nanosized alkaline earth metal carbonate and nanosized alkali metal carbonate particles;

transporting the ready-mixed composition in a mixing vehicle unto a work site, the ready-mixed composition being transported and mixed under conditions maintaining workability thereof;

discharging the ready-mixed composition from the mixing vehicle in a deposit zone of the work site to produce a ready-to-cure concrete material; and curing the ready-to-cure concrete material to produce the concrete material containing carbon dioxide from the $CO_2$-containing water and sequestered under the form of $CO_2$ and/or carbonate compounds;

wherein the concrete mixture further comprises at least one $CO_2$-sequestering chemical, the $CO_2$-sequestering chemical maximizing availability of the cementitious material for hydration.

In another aspect, there is provided a dry-batch process for sequestering carbon dioxide ($CO_2$) in concrete material, the process comprising the steps of:

feeding a concrete mixture to a mixing device located directly on a work site, the concrete mixture comprising a cementitious material, aggregates and at least one $CO_2$-sequestering chemical, the $CO_2$-sequestering chemical maximizing availability of the cementitious material for hydration;

feeding a $CO_2$-containing water to the mixing device, the $CO_2$-containing water comprising water and at least one of blended $CO_2$ gas bubbles, dissolved $H_2CO_3$, carbonate ions ($CO_3^{2-}$), bicarbonate ions ($HCO^{3-}$), nanosized alkaline earth metal carbonate and nanosized alkali metal carbonate particles;

mixing the concrete mixture with the $CO_2$-containing water in a mixing chamber of the mixing device to produce a wet concrete mixture;

discharging the wet concrete mixture from the mixing device in a deposit zone of the work site to produce a ready-to-cure concrete material; and curing the ready-to-cure concrete material to produce the concrete material containing carbon dioxide from the $CO_2$-containing water and sequestered under the form of $CO_2$ and/or carbonate compounds.

In another aspect, there is provided a system for the production of a wet carbonated concrete mixture, the system comprising:

a water feed tank providing a flow of water via an outlet thereof;

a mixer receiving a concrete mixture, the concrete mixture comprising a cementitious material and aggregates; and a feed line ensuring fluid communication between the outlet of the water feed tank and an inlet of the mixer; and a $CO_2$-injector mounted on the feed line upstream of the mixer for injecting carbon dioxide into the flow of water to produce a flow of $CO_2$-containing water;

wherein the flow of $CO_2$-containing water is fed to the inlet of the mixer via the feed line for mixing thereof with the concrete mixture and production of a wet carbonated concrete mixture.

In another aspect, there is provided a ready-mixed truck for the production of a ready-mixed composition, the ready-mixed truck comprising:

a mixing drum receiving a concrete mixture, the concrete mixture comprising a cementitious material and aggregates; and a water feed line in fluid communication with the drum of the ready-mixed truck; and a $CO_2$-injector mounted on the water feed line upstream of the ready-mixed truck for injecting carbon dioxide into water flowing via the water feed line and produce a flow of $CO_2$-containing water;

wherein the flow of $CO_2$-containing water is fed to the ready-mixed truck via the water feed line for mixing thereof with the concrete mixture and production of the ready-mixed composition.

In some implementations of the ready-mixed composition and pre-mix composition, the concrete mixture further comprises $CO_2$-sequestering chemicals for accelerating a sequestration speed at which the carbon-dioxide is captured, and maximizing the captured amount of the carbon dioxide from the $CO_2$-containing water in the concrete mixture. The $CO_2$-sequestering chemicals can comprise at least one alkali metal compound, at least one alkaline earth metal compound or a combination thereof. Reaction products can therefore result from at least one of the three following chemical reactions:

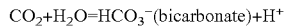

$CO_2 + H_2O = HCO_3^- \text{(bicarbonate)} + H^+$

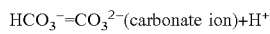

$HCO_3^- = CO_3^{2-} \text{(carbonate ion)} + H^+$

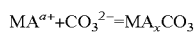

$MA^{a+} + CO_3^{2-} = MA_xCO_3$ wherein $MA^{a+}$ is an alkali ion or an alkaline earth metal ion resulting from the reaction of water with at least one of the cementitious material and the $CO_2$-sequestering chemicals, and wherein the reaction products comprise at least one of a bicarbonate ion, a carbonate ion, an alkaline earth metal carbonate and an alkali metal carbonate.

In some implementations, the $CO_2$-sequestering chemical comprises at least one alkali metal compound, at least one alkaline earth metal compound or a combination thereof. For example, the $CO_2$-sequestering chemical can be at least one of steel slag and lime.

In some implementations, the $CO_2$-containing water comprising water, blended $CO_2$ gas bubbles, and at least one of nanosized alkaline earth metal carbonate and nanosized alkali metal carbonate particles. Optionally, the $CO_2$-containing water is process water. Optionally, the $CO_2$ containing water includes at least 1 kg of $CO_2$ per m3.

In some implementations, the methods and processes described herein include injecting carbon dioxide into water in at least one of a gas phase, liquid phase at a CO2 injection flow rate between 40 L/min to 1000 L/min, optionally between 100 L/min to 600 L/min in gas phase, or 1 L/min to 40 L/min, optionally between 5 L/min to 20 L/min in liquid phase.

In some implementations, a controller (also referred to as a batching computer) is included to simultaneously control the batching of specific amounts of the concrete mixture and of the water, and at least one of the water flow rate and $CO_2$ injection speed.

While the invention will be described in conjunction with example embodiments, it will be understood that it is not intended to limit the scope of the invention to such embodiments. On the contrary, it is intended to cover all alternatives, modifications and equivalents as may be included as defined by the present description. The objects, advantages and other features of the present invention will become more apparent and be better understood upon reading of the following non-restrictive description of the invention, given with reference to the accompanying drawings.

Figure 1:
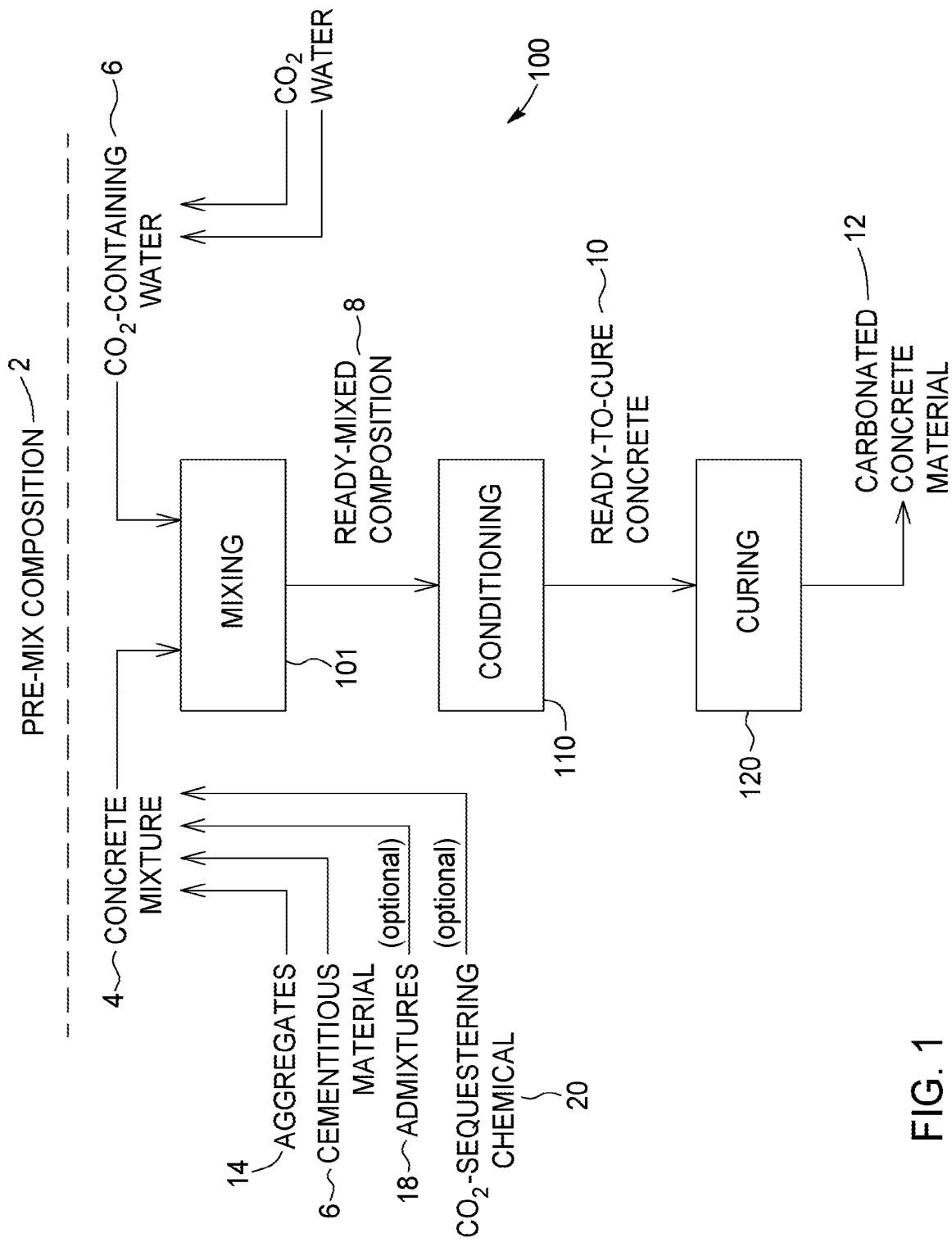
FIG. 1 is a schematic process flowchart of general steps for producing carbonated concrete material from a concrete mixture and $CO_2$-containing water.

While the invention will be described in conjunction with example embodiments, it will be understood that it is not intended to limit the scope of the invention to these embodiments. On the contrary, it is intended to cover all alternatives, modifications and equivalents as may be included as defined by the appended claims.

DETAILED DESCRIPTION

It should be noted that the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only. Therefore, the descriptions, examples, methods and materials presented in the claims and the specification are not to be construed as limiting but rather as illustrative only.

It is worth mentioning that throughout the following description when the article "a" is used to introduce an element it does not have the meaning of "only one" it rather means of "one or more". It is to be understood that where the specification states that a component, feature, structure, step or characteristic "may", "might", "can" or "could" be included, that particular component, feature, structure, step or characteristic is not required to be included.

In the following description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

In the present description, an embodiment is an example or implementation of the inventions. The various appearances of "one embodiment," "an embodiment" or "some embodiments" do not necessarily all refer to the same embodiments. Although various features or implementations of the invention may be described in the context of a single embodiment, the features may also be provided separately or in any suitable combination. Conversely, although the invention may be described herein in the context of separate embodiments for clarity, the invention may also be implemented in a single embodiment.

Aspects of the invention described herein relate to concrete ready-mixed and pre-mix compositions, methods, processes, and systems, each of these aspects having at least one implementation. All implementations relate to sequestering $CO_2$ in concrete, resulting in producing carbonated concrete.

Composition Implementations

Embodiments of the concrete composition include a wet composition that can be referred to as ready-mixed composition, and a dry composition that can be referred to as a pre-mix composition, both compositions including $CO_2$-containing water for the production of a concrete material containing sequestered $CO_2$.

More particularly, there is provided a ready-mixed composition including a concrete mixture and $CO_2$-containing water. The ready-mixed composition may be also referred to as freshly mixed concrete, wet concrete mixture, wet carbonated concrete mixture or a wet concrete batch. In the ready-mixed composition, the $CO_2$-containing water is fully mixed with the concrete mixture and the ready-mixed composition has a consistency allowing workability of the ready-mix composition.

Workability of the ready-mix composition directly refers to the ability to work with said composition. Workability of the ready-mix composition enables transport of the composition to a work site, mixing, pumping, pouring, molding, shaping, compacting, finishing thereof and/or any other operation needed to provide concrete at the desired location and into the desired shape. As known by one skilled in the art, workability can be determined by performing a slump and/or slump flow test on the ready-mixed composition, or by measuring the amount of energy required to overcome friction while compacting.

In some implementations, the ingredients of the ready-mixed composition are mixed in advance in a stationary mixer, from a concrete plant for instance, and can be loaded in a transit or a ready-mixed concrete truck for delivery to a work site. In some other implementations, the ready-mixed composition may also result from the mixing of concrete ingredients in a ready-mixed truck or another mixing device directly on a work site.

In another embodiment, a pre-mix composition is provided and includes a concrete mixture and $CO_2$-containing water. The pre-mix composition includes the same ingredients as the ready-mixed composition but the $CO_2$-containing water is not in mixed state with the remaining ingredients of the composition. The ready-mixed composition can be therefore prepared by mixing the $CO_2$-containing water and the concrete mixture from the pre-mix composition.

In some implementations, the ingredients of the pre-mix composition are batched in a concrete plant, transited without being combined together. The pre-mix composition is mixable by a ready-mixed truck or another mixing device directly on the work site, to form a ready-mixed composition that will harden into concrete. The pre-mix composition may therefore be referred to as a dry concrete batch.

It should be noted that $CO_2$ sequestration refers herein to the incorporation of an amount of $CO_2$ in an early concrete production stage via water. The water acts as a medium which receives an initial amount of $CO_2$, before being mixed with other concrete ingredients (at least a cementitious material and aggregates). Water including an initial amount of carbon dioxide is referred to herein as $CO_2$-containing water. $CO_2$-containing water as encompassed herein includes a $CO_2$ to water ratio between about 2 g/L and 200 g/L, optionally between about 2 g/L to 100 g/L, further optionally between 5 g/L to 80 g/L. The $CO_2$-containing water is tailored for reaction with $MA^{a+}$ ions from the concrete mixture for the preparation of carbonated concrete, the $MA^{a+}$ ions being at least one of an alkali metal ion and an alkaline metal earth ion.

It should be further noted that depending on the source of water used for the preparation of concrete, $CO_2$ may be present in water under different forms which include $CO_2$ gas bubbles, dissolved $CO_2$ ($H_2CO_3$), carbonate ions ($CO_3^{2-}$), bicarbonate ions ($HCO_3^-$) and nanosized carbonate particles. Depending on the pH of the water and the nature of components contained in the water used for the preparation of the concrete, $CO_2$ may already react with these components and start forming secondary components. The water may be sourced from a municipal water network and/or deriving from an upstream process as recycled process water. For example, the $CO_2$-containing water can be prepared from process water derived from concrete production, which may include calcium-based minerals which react with carbonate and bicarbonate ions from the added $CO_2$, thereby forming the $CO_2$-containing water including nanosized calcium carbonate particles.

It should further be noted that the $CO_2$ may be sourced as pure carbon dioxide, carbon dioxide from a flue gas deriving from the burning of fossil fuels or from other industrial processes including cement manufacture, or combinations thereof.

It should be noted that the processes and methods described herein can include the preparation of the $CO_2$-containing water. Systems to prepare the $CO_2$-containing water can include two feed lines for $CO_2$ and water respectively (as seen on FIG. 5), each line being provided with a flow meter (not illustrated) so as to adjust the water flow rate in accordance to the $CO_2$ injection speed depending on the desired $CO_2$ dosage and desired $CO_2$-containing water batch quantity for a concrete mixture batch.

Ingredients of the concrete mixture from the presently described compositions may vary depending on the properties to be conferred to the hardened concrete and the desired hardening time. The concrete mixture at least includes a cementitious material and aggregates. The cementitious material can include cement only or supplementary cementitious materials (SCMs). The cement is a hydraulic cement, optionally Portland cement. The SCMs may include fly ash, ground granulated blast furnace slag (GGBS), silica fume, siliceous material, aluminosilicate material, calcined clay, metakaolin, ground glass, natural Pozzolanic materials, or any combinations thereof. The aggregates may include, without being limited to, sand, gravel, crushed stone or any combinations thereof.

One skilled in the art will readily understand how to batch, i.e. measure a needed amount of, each ingredient of the concrete mixture and the $CO_2$-containing water depending on the properties desired for the resulting concrete. For example, the cementitious material per cubic meter of concrete may range between about 10 kg/m$^3$ and about 2000 kg/m$^3$. The $CO_2$-containing water to cementitious material weight ratio may range between about 0.15 and about 10.

The cementitious material may be hydraulic cement which is known to mainly include tricalcium silicate ($C_3S$), dicalcium silicate ($C_2S$), tricalcium aluminate ($C_3A$), tetracalcium aluminoferrite ($C_4AF$), and gypsum ($CSH_2$). Hydration of hydraulic cement into secondary components provides strength to the resulting concrete according to the following chemical reactions during hydration. The cementitious material may be blended hydraulic cement, including Portland blast furnace slag cement (S), Portland fly ash cement (F); Portland silica fume cement (SF), ternary blended cement, and quaternary blended cement is also involved in the following reactions.

The tricalcium aluminate reacts with the gypsum in the presence of water to produce ettringite and heat according to chemical reaction (1).

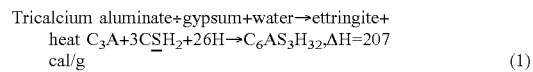

Tricalcium aluminate+gypsum+water→ettringite+ heat $C_3A+3C\underline{S}H_2+26H→C_6A\underline{S}_3H_{32},\Delta H=207$ cal/g (1)

Once all the gypsum is used up as per reaction (1), the ettringite becomes unstable and reacts with any remaining tricalcium aluminate to form monosulfate aluminate hydrate crystals according to chemical reaction (2):

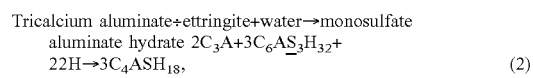

Tricalcium aluminate+ettringite+water→monosulfate aluminate hydrate $2C_3A+3C_6A\underline{S}_3H_{32}+ 22H→3C_4A\underline{S}H_{18}$, (2)

The tricalcium silicate is hydrated to produce calcium silicate hydrates, lime and heat according to chemical reaction (3):

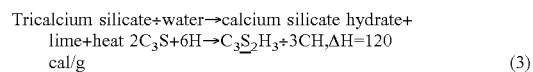

Tricalcium silicate+water→calcium silicate hydrate+ lime+heat $2C_3S+6H→C_3S_2H_3+3CH,\Delta H=120$ cal/g (3)

Calcium silicate hydrate, referred to as CSH, has a short-networked fiber structure which contributes greatly to the initial strength of the cement paste.

The dicalcium silicate also hydrates to form calcium silicate hydrates and heat according to chemical reaction (4):

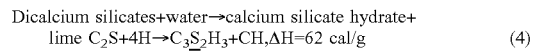

Dicalcium silicates+water→calcium silicate hydrate+ lime $C_2S+4H→C_3S_2H_3+CH,\Delta H=62$ cal/g (4)

Like in reaction (3), CSH contributes to the strength of the cement paste. Reaction (4) however generates less heat and proceeds at a slower rate than reaction (3), meaning that the contribution of dicalcium silicate to the strength of the cement paste will be slow initially. Dicalcium silicate is still responsible for the long-term strength of the resulting concrete.

The ferrite undergoes two progressive reactions with the gypsum. The ferrite reacts with the gypsum and water to form ettringite, lime and alumina hydroxides according to reaction (5); and the ferrite further reacts with the ettringite formed according to reaction (1) to produce garnets according to reaction (6):

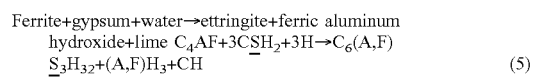

Ferrite+gypsum+water→ettringite+ferric aluminum hydroxide+lime $C_4AF+3C\underline{S}H_2+3H→C_6(A,F)\underline{S}_3H_{32}+(A,F)H_3+CH$ (5)

Ferrite+ettringite+lime+water→garnets $C_4AF+C_6(A,F)\underline{S}_3H_{32}+2CH+23H \rightarrow 3C_4(A,F)\underline{S}H_{18}+(A,F)H_3$ (6)

As an initial amount of $CO_2$ is provided to the water before contacting the concrete mixture, hydration of carbon dioxide occurs according to equation (7) and (8), such that $H_2CO_3$ is in equilibrium with carbonate and bicarbonate ions in dissolved state.

$CO_2+H_2O=HCO_3^-\text{(bicarbonate)}+H^+$ $HCO_1^-=CO_3^{2-}\text{(carbonate ion)}+H^+$ (7) and (8)

It should be understood that other reactions may occur within the water medium depending on the source of water used to prepare the $CO_2$-containing water, i.e. depending on the nature and amount of components that may be included in the water. As above-mentioned, $CO_2$ may be present in the $CO_2$-containing water under different forms which include $CO_2$ gas bubbles, dissolved $CO_2$ ($H_2CO_3$), carbonate ions ($CO_3^{2-}$), bicarbonate ions ($HCO_3^-$) and nanosized carbonate particles. For example, nanosized calcium carbonate particles may be present in the $CO_2$-containing water, if the source of water used for the preparation of the $CO_2$-containing water is a process water which is recycled from concrete production and contains calcium-based compounds. Other carbonate particles may be present, mainly as alkaline earth metal carbonate and alkali metal carbonate particles, depending on the nature of the compounds present in the process water deriving from concrete production. It should be noted that the process water may also include suspended particles of cement and cement hydration products. It should be noted that all species deriving from the presence of $CO_2$ in the $CO_2$-containing water, before contacting the concrete mixture (cement, aggregates, etc.) can be referred to herein as carbon-based compounds, including $CO_2$ gas bubbles, dissolved $H_2CO_3$, carbonate ions ($CO_3^{2-}$), bicarbonate ions ($HCO^{3-}$), nanosized alkaline earth metal carbonate and nanosized alkali metal carbonate particles.

Carbonation reactions further occur between carbon-based compounds, and at least one of cementitious component and cement hydration product. Indeed, as the cementitious material comes into contact with the $CO_2$-containing water, hydration reactions and carbonation reactions occur. Carbonation of the hydration products formed during chemical reactions (1) to (6) lead to the formation of alkaline earth metal carbonate particles and/or alkali metal carbonate particles. Calcium hydroxide (referred to as lime CH in equations (1) to (6)) releases calcium ions which are consumed by carbon-based compounds from the CO-containing water as calcium carbonate has a lower solubility compared to cement hydration products (see chemical equilibrium equations (9) to (11) for example). Calcium ions may further be released from cement hydration products, including CSH, to form calcium carbonate or hydration products with a lower calcium oxide/silicate oxide ratio. Formation of compounds through carbonation reactions may therefore impact the concrete properties such as strength development.

$Ca(OH)_2 \rightarrow Ca^{2+}+2OH^-$ (9)

$Ca^{2+}+CO_3^{2-} \rightarrow CaCO_3$ (10)

$H^++OH^- \rightarrow H_2O$ (11)

In some implementations, the concrete mixture can include additional ingredients including $CO_2$-sequestering chemicals.

$CO_2$-sequestering chemicals can be added as part of the concrete mixture to be mixed with the $CO_2$-containing water for accelerating a sequestration speed and maximizing the captured amount of $CO_2$ from the $CO_2$-containing water in the formed wet concrete mixture. Optionally, the $CO_2$-sequestering chemicals comprise at least one alkali metal compound, at least one alkaline earth metal compound or a combination thereof. Optionally, the $CO_2$-sequestering chemicals comprise grounded steel slag, cement kiln bypass dust (CKD) or a combination thereof. Optionally, the $CO_2$-sequestering chemical to cementitious material weight ratio is between about 0.5% and about 10%.

Advantageously, the $CO_2$-sequestering chemicals release an alkali ion and/or an alkaline earth metal ion ($MA^{a+}$) which can also react with carbon-based compounds from the $CO_2$-containing water to form alkali metal or alkaline earth metal carbonate compound which mitigates the competition of alkali metal or alkaline earth metal ions from cement hydration products. For example, grounded steel slag includes CaO, MgO, and other alkali oxides in small amounts, which when in contact with the $CO_2$-containing water, release their alkali and alkaline earth metal ions (for example $Ca^+$, $Na^+$, $K^+$, $Mg^{2+}$, etc.), thereby reacting with carbon-based compounds from the $CO_2$-containing water to form nano-sized carbonated compounds.

Once the concrete mixture is in contact with the $CO_2$-containing water, reaction products resulting from at least the following chemical reaction (12) may be formed within the resulting wet batch concrete:

$MA^{a+}=CO_3^{2-}=MA_xCO_3$ (12)

$MA^{a+}$ is an alkali metal ion or an alkaline earth metal ion resulting from the reaction of water with at least one of the cementitious material and the $CO_2$-sequestering chemicals (a being equal to 1 or 2), and the reaction products include at least one of alkaline earth metal carbonate particles and alkali metal carbonate particles (x being equal to 1 or 2). The carbonate particles form and take place mostly in the pores of the forming concrete which densifies the concrete microstructure and can further possibly enhance certain properties of the concrete including strength development.

Nanosized alkaline earth metal carbonate particles and alkali metal carbonate particles are therefore produced from carbonation of at least one of cement components, cement hydration products, and $CO_2$-sequestering chemicals. Presence of carbon-based compounds in the $CO_2$-containing water before contact with the concrete mixture, which optionally include $CO_2$-sequestering chemicals, enables to enhance distribution of the nanosized alkaline earth metal carbonate particles and alkali metal carbonate particles within the forming concrete microstructure, thereby enhancing specific concrete properties such as strength, permeability, durability as the pores are filled with distributed nanosized material. The techniques described herein may enable to obtain an even distribution of nanosized carbonate compounds within the concrete network microstructure.

In some implementations, the concrete mixture can include admixtures.

The admixtures can be added as part of the concrete mixture to be mixed with the $CO_2$-containing water to modify physico-chemical properties of the resulting wet concrete mixture including workability, hardening time and durability. The admixtures comprise at least one of a water reducer, an air entrainment agent, a plasticizer, a superplasticizer, an accelerator, a viscosity modifier, a waterproofing agent, and a retarder.

It should be noted that the concrete mixture may include one or more admixture(s) including an accelerating admixture which accelerates the setting and early strength development of concrete; a retarding admixture retards the setting of concrete; a water-reducing admixture which reduces the quantity of mixing water required to produce concrete of a given consistency; a water-reducing admixture—high range which reduces the quantity of mixing water required to produce concrete of a given consistency by 12% or greater; a water-reducing and accelerating admixture which reduces the quantity of mixing water required to produce concrete of a given consistency and accelerates the setting and early strength development of concrete; a water-reducing and retarding admixture which reduces the quantity of mixing water required to produce concrete of a given consistency and retards the setting of concrete; a water-reducing—high range—retarding admixture which reduces the quantity of mixing water required to produce concrete of a given consistency by 12% or greater and retards the setting of concrete; an air-entraining admixture which is added to the batch immediately before or during its mixing, for the purpose of entraining air; a specific performance admixture which provides a desired performance characteristic(s) other than reducing water content, or changing the time of setting of concrete, or both, without any adverse effects on fresh, hardened and durability properties of concrete as specified herein, excluding admixtures that are used primarily in the manufacture of dry-cast concrete products.

One skilled in the art will readily know how to select an amount of admixtures to be added as part of the concrete mixture for further mixing thereof with the $CO_2$-containing water, according to the desired effects to be conferred to the resulting freshly mixed concrete as above-detailed.

In some implementations, the concrete mixture may further include at least one of mineral fillers, fibers, and colour pigments.

Method and Process Implementations

Various implementations of a method for sequestering $CO_2$ in concrete and a process for the preparation of a carbonated concrete material derive from the preparation of the above-mentioned compositions.

In a first aspect, there is provided a general method of sequestering $CO_2$ in hardening concrete. Hardening concrete refers a concrete in which chemical equilibrium is not reached yet and still undergoes hydration reactions with $H_2O$ and carbonation reactions with carbon-based compounds deriving from $CO_2$.

The method can include providing a $CO_2$-containing water comprising at least one of carbonic acid, carbonate ions, bicarbonate ions, nanosized alkaline earth metal carbonate particles and nanosized alkali metal carbonate particles. The $CO_2$-containing water can be prepared by dissolving $CO_2$ into water. Once an initial amount of $CO_2$ is provided into the water, the $CO_2$ being converted into at least one carbonic acid, carbonate ions, bicarbonate ions, nanosized alkaline earth metal carbonate particles and nanosized alkali metal carbonate particles by hydration reaction and potential additional chemical reactions. The compounds that are present in the $CO_2$-containing water and deriving from the presence of $CO_2$ in water can be referred to as carbon-based compounds. The amount of $CO_2$ to be provided in the water depends on the amount desired to be present in the water as carbon-base compounds and the amount to be sequestered into the hardening concrete under the form of carbonate particles and/or $CO_2$. For example, the $CO_2$ may be present at a concentration between 2 g and 100 g per liter of water. One skilled in the art can readily understand that preparation of the $CO_2$-containing water may be handled upstream of the main concrete production. For example, providing recycled process water such as process water from concrete production including carbonate particles is to be considered as providing $CO_2$-containing water according to the present methods.

The method further includes preparing the concrete mixture as defined herein by mixing the cementitious material and the aggregates. Preparing the concrete mixture may further include mixing additional concrete ingredients such as admixtures, $CO_2$-sequestering chemicals, mineral fillers, fibers, and colour pigments.

The method further includes mixing the $CO_2$-containing water with the concrete mixture to induce hydration reaction of the cementitious material with water and carbonation reaction of the cementitious material (and additional components such as $CO_2$-sequestering chemicals if any) with carbon-based compounds. This step allows for the production of the ready-mix composition as defined herein, thereby sequestering the initial amount of carbon dioxide into the hardening concrete. One skilled in the art will readily understand that the term "sequester", and its synonyms that can be used herein such as "capture", means that the $CO_2$, that can be present in the water under the form of carbon-based compounds, is converted into secondary carbonate components (carbonate particles, bicarbonate ions, carbonate ions) that are part of the concrete network or as gas bubbles entrapped in the formed concrete.

In some implementations, preparing the concrete mixture may further include mixing at least one $CO_2$-sequestering chemical with the remaining ingredients of the concrete mixture. The at least one $CO_2$-sequestering chemical can be selected to mitigate the carbonation reaction of the cementitious material by releasing another carbonatable species, which will be carbonated instead of the cementitious material in presence of the $CO_2$-containing water according to equation (12). The resulting carbonate compounds are more stable and possesses lower water solubility than cement hydration products. It should be noted that depending on the ingredients included in the concrete mixture, additional reactions may occur when the $CO_2$-containing water is mixed with the concrete mixture. For example, other carbonation reactions may involve the $CO_2$-sequestering chemicals instead of the cementitious material, thereby rendering an increased quantity of cementitious material available for hydration reactions instead of carbonation reactions. The method may include selecting operational conditions favoring hydration and/or carbonation reactions of specific compounds among the concrete mixture ingredients.

Figure 2:
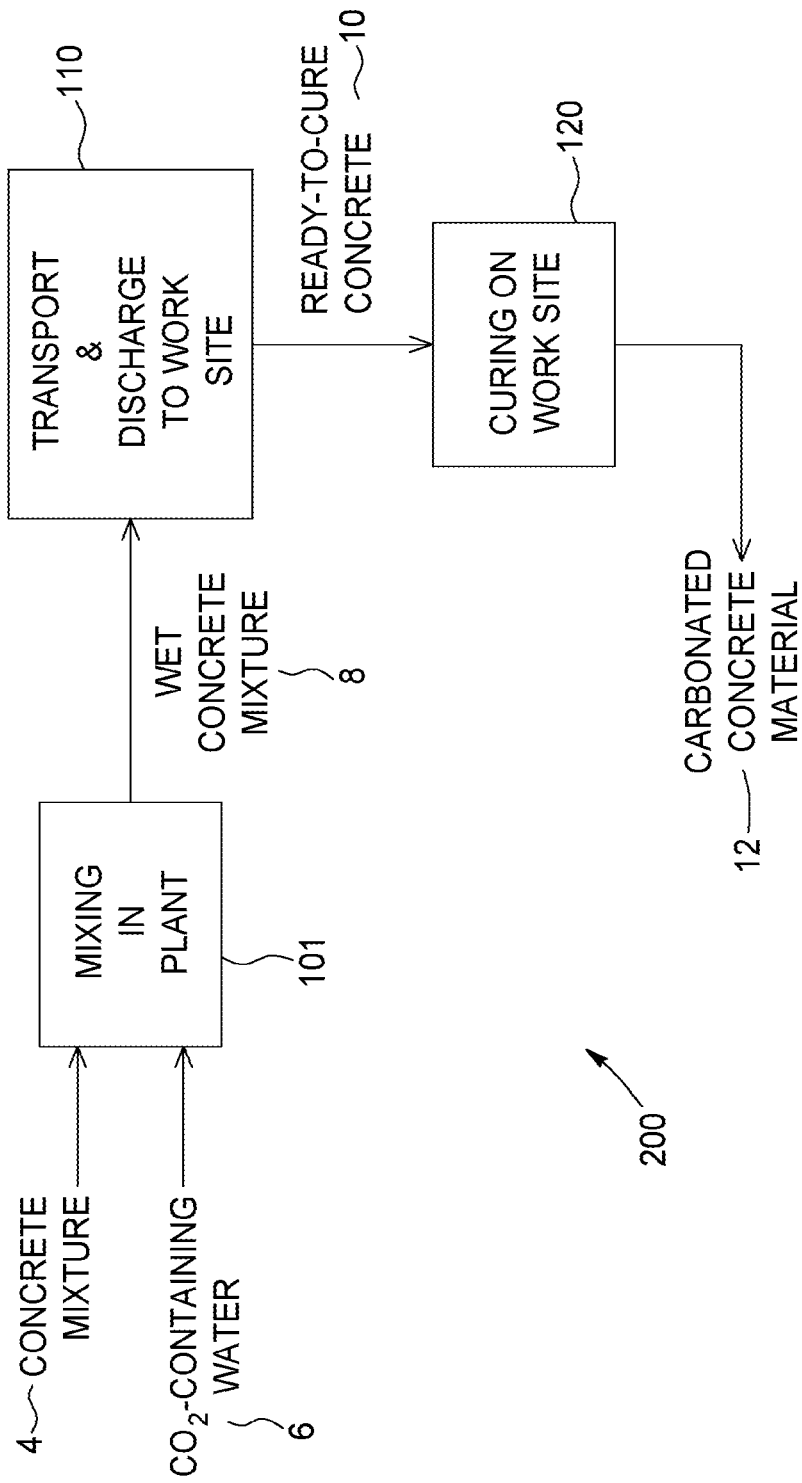
FIG. 2 is a schematic process flowchart of general steps for producing a wet concrete mixture in a central plant from a concrete mixture and $CO_2$-containing water, which will be cured on a work site.
Figure 3:
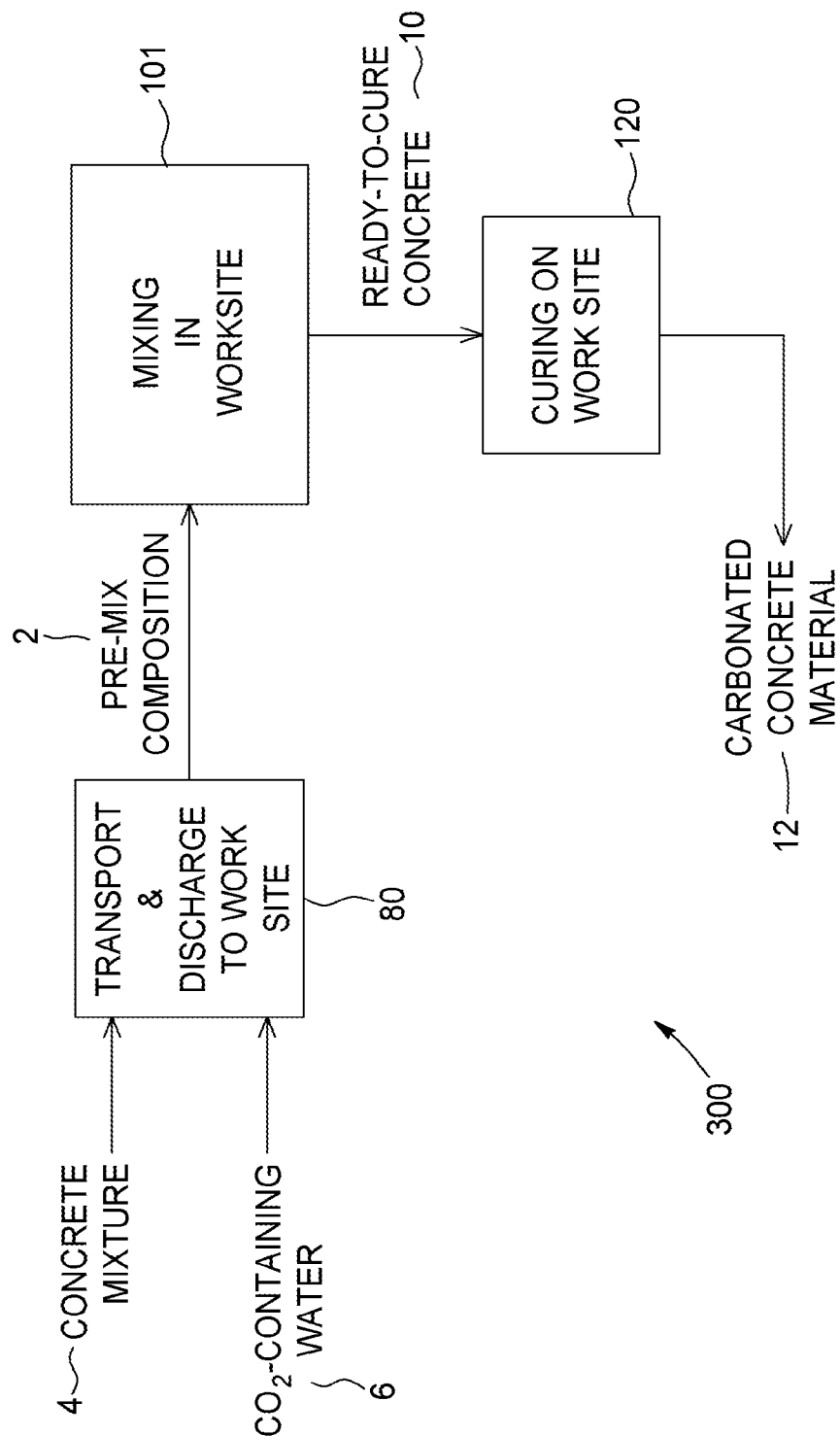
FIG. 3 is a schematic process flowchart of general steps for producing a ready-to-cure concrete on a work site from a pre-mix composition including a concrete mixture and $CO_2$-containing water.

In another aspect, referring to FIGS. 1 to 3, there are provided general process 100 steps to prepare a carbonated concrete material. Implementations of such process steps include a wet batch process 200 wherein a ready-mixed composition as defined herein is prepared in advance and transported for delivery on work site; and a dry batch process 300 wherein the concrete mixture is mixed with the $CO_2$-containing water directly on the work site.

Referring to FIG. 1, the process includes providing the ingredients of the pre-mix composition 2, including the concrete mixture 4 and the $CO_2$-containing water 6. The process then includes mixing 101 the concrete mixture 4 with the $CO_2$-containing water 6 to produce the wet concrete mixture 8. The concrete mixture 4 includes aggregates 14, cementitious material 16, and optionally at least one of admixtures 18 and $CO_2$-sequestering chemical 20. This mixing step 101 is performed in mixing conditions allowing workability of the wet concrete mixture 8 (ready-mixed composition 8 in FIG. 1). The mixing conditions comprise at least one of a mixing temperature, a mixing time, a water to cementitious material weight ratio, an admixture to cementitious material weight ratio, and any other characteristic that is controllable to ensure that the wet concrete mixture is workable.

The workability of the resulting mixture is important as this mixture will undergo at least one of batching, transporting, mixing, pumping, pouring, discharging, depositing, molding, forming/shaping, compacting, finishing thereof and any other operation needed to provide concrete at the desired location and into the desired shape. All these potential operations that can be performed on the wet concrete mixture before the concrete is ready to be cured are referred to as conditioning operations. Still referring to FIG. 1, the process therefore further includes conditioning 110 the wet concrete mixture 8 to produce a ready-to-cure concrete 10. The ready-to-cure concrete 10 is a conditioned concrete which is finished and formed according to the needs of the work site (foundation, wall, building material, object, surface treatment, etc.). The ready-to-cure concrete 10 is however not fully hardened into carbonated concrete.

Still referring to FIG. 1, the process further includes allowing the ready-to-cure concrete 10 to harden in curing conditions and produce the carbonated concrete material 12 upon hydration and/or carbonation of the cementitious material. It should be understood that depending on the ingredients of the concrete mixture 4, carbonatable compounds may also derive from additional ingredients including $CO_2$-sequestering chemicals. For example, the process may further include mixing at least one $CO_2$-sequestering chemical 20 to produce the wet concrete mixture 8.

The amount of $CO_2$ which is captured in the wet concrete mixture is increased by such addition of at least one $CO_2$-sequestering chemical. Indeed, the $CO_2$-sequestering chemical releases carbonatable compounds which are ready to be carbonated by the carbon-based compound from the $CO_2$-containing water, and thereby produce nanosized carbonate particles. Hydration and hardening of the cementitious material is advantageously favored as carbon-based compounds from the $CO_2$-containing water react with the carbonatable compounds from the $CO_2$-sequestering chemical instead of from the cementitious material.

Curing conditions may be selected and controlled to favor hydration and hardening of the ready-to-cure concrete, while mitigating carbonation of the cementitious material. Curing conditions include curing time, curing temperature and $CO_2$-sequestering chemical to cementitious material weight ratio. Optionally, the curing time may range between about 24 hours and about 7 days. Further optionally, the curing temperature may range between about −40° C. and about 55° C. Further optionally, the $CO_2$-sequestering chemical to cementitious material weight ratio is between about 0.5% and about 10%.

Figure 6:
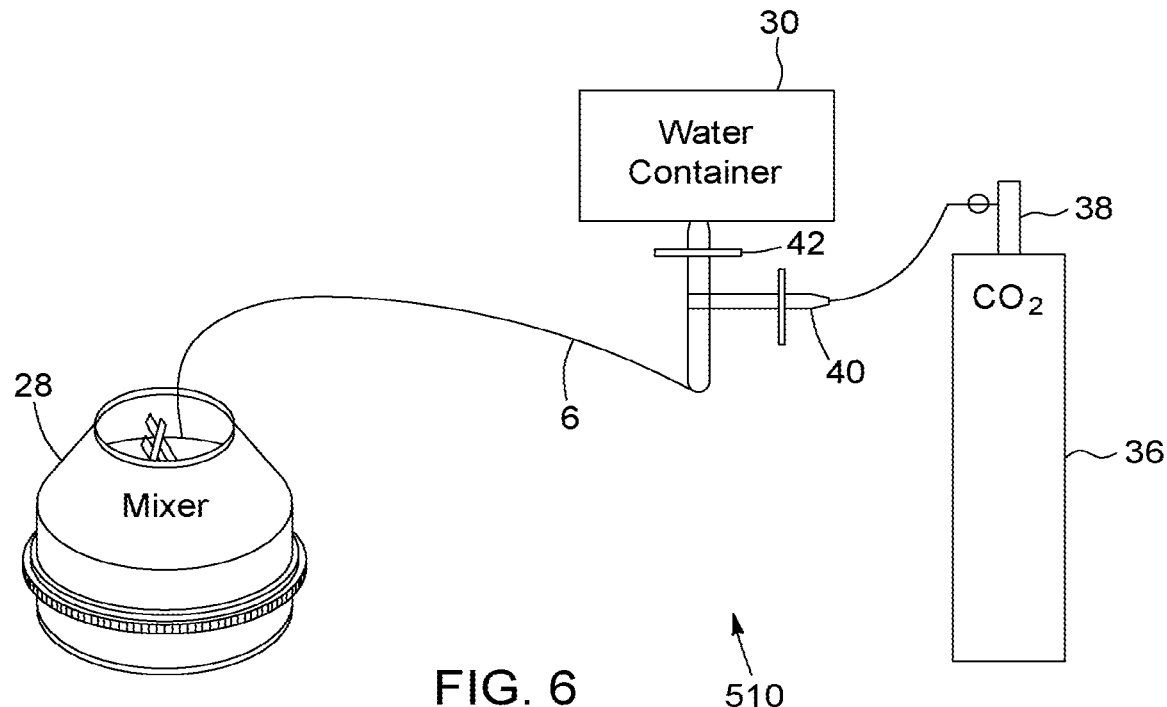
FIG. 6 is schematic representation of a one-tank system for injecting $CO_2$ into water before mixing with concrete mixture.
Figure 7:
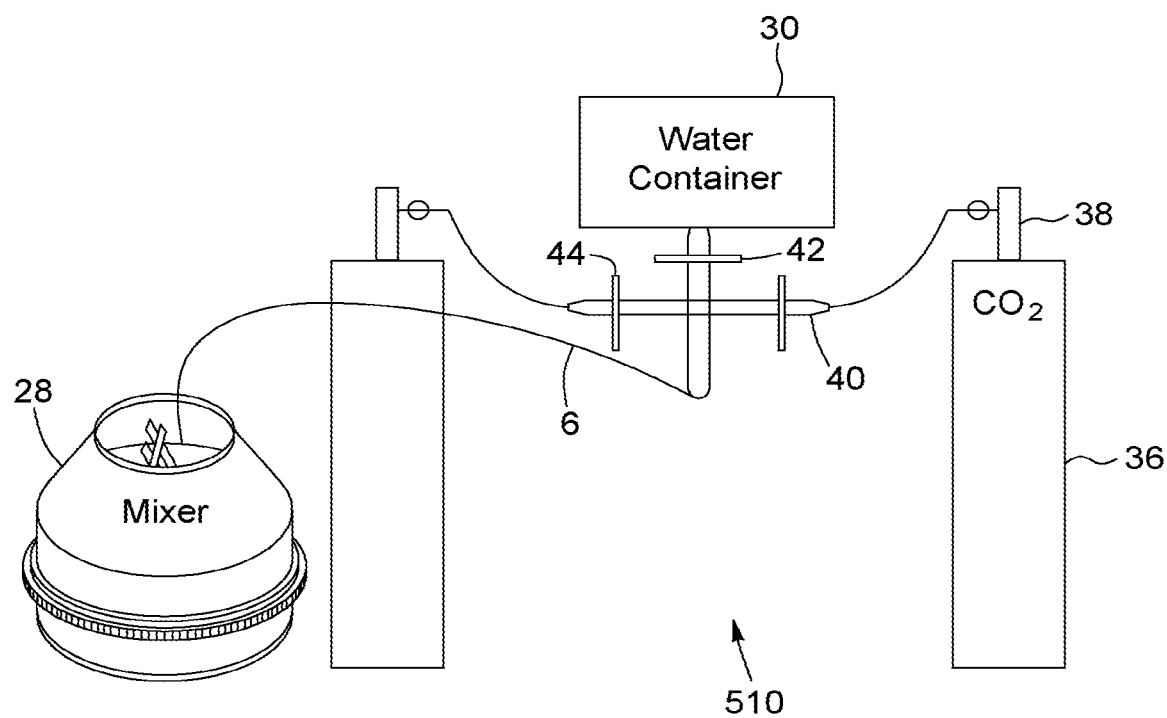
FIG. 7 is schematic representation of a two-tank system for injecting $CO_2$ into water before mixing with concrete mixture.

In some implementations, the process may include the preparation of the $CO_2$-containing water. Such preparation can be performed by injecting gaseous $CO_2$, by blending liquid $CO_2$, by dissolving solid $CO_2$ or carbon-based compounds derived from $CO_2$. Alternatively, the process may include providing a ready-to-use $CO_2$-containing water, such as a process water that includes carbon-based compounds derived from $CO_2$. An implementation wherein gaseous $CO_2$ is injected into water before mixing with the concrete mixture is illustrated in FIGS. 6 and 7, and detailed in the experimentation section.

In some implementations, such as in a dry batch process 300 illustrated in FIG. 3, the process may include providing the $CO_2$-containing water 6 and the concrete mixture 4 in batched amounts to form a pre-mix composition 2 as defined herein, before mixing 101 thereof to produce the wet concrete mixture 8 and then the ready-to-cure concrete 10. The batched amounts of concrete ingredients are selected according to an amount or volume of carbonated concrete material 12 to be prepared.

In other implementations, such as in a wet batch process 200 illustrated in FIG. 2, the conditioning 110 of the wet concrete mixture 8 may include batching of the wet concrete mixture 8 in a batched amount to form a ready-mix composition as defined herein. The batched amount of ready-mix composition is selected according to an amount or volume of carbonated concrete material to be prepared. The conditioning 110 further includes transporting and discharging the batched amount of ready-mix composition 8 to produce the ready-to-cure concrete 10 on the work site.

In one embodiment, there is provided a dry batch process for sequestering $CO_2$ in concrete material. A dry batch process makes use of the pre-mix composition as defined herein such that the concrete mixture is contacted with the $CO_2$-containing water directly on the work site. This process avoids handling a ready-mixed composition that has started to chemically react before reaching the work site where concrete is needed.

More particularly, the dry batch process includes feeding the pre-mix composition, including the concrete mixture and the $CO_2$-containing water in an unmixed state, to a mixing device which is located on the work site. It should be understood that an unmixed state includes the feeding of the concrete mixture independently from the feeding of the $CO_2$-containing water to the mixing device. As mentioned above, the concrete mixture includes at least a cementitious material and aggregates, and may further includes admixtures, $CO_2$-sequestering chemicals, mineral fillers, fibers and/or coloring pigments.

In the implementation illustrated in FIG. 3, the process includes transporting 80, via a transit truck and delivering to the work site, batched amounts of concrete mixture 4 and $CO_2$-containing water 6 in an unmixed state, as a pre-mix composition 2. The transit truck may be a ready-mixed truck or any vehicles able to transport batched amounts of ingredients in an unmixed state. Batching of the ingredients in advance can be performed via a ready-mixed batching system (not illustrated in FIG. 3). The dry batch process 300 further includes mixing 101 the batched concrete mixture 4 with the $CO_2$-containing water 6 in a mixing device on site to produce the wet concrete mixture as defined herein. One skilled in the art will readily understand that the mixing device refers to a ready-mixed truck or a stationary mixer that is provided on the work site. One skilled in the art will know that a typical ready-mixed truck has an on-route mixing functionality to mix the concrete and maintain concrete in workable conditions.

It should be noted that depending on the ingredients of the concrete mixture, independent feeding lines may have to be used to provide ingredients of the concrete mixture into the ready-mixed drum of the truck or the stationary mixer. For example, depending on the compatibility of the admixtures with the water and/or cementitious material, admixtures may have to be fed independently from water and other concrete mixture ingredients.

In another embodiment, there is provided a wet batch process for sequestering $CO_2$ in concrete material. A wet batch process makes use of a ready-mixed composition as defined herein which is batched and tailored to the needed properties of the concrete. The wet batch process avoids handling mixing concrete ingredients on site to prepare the ready-mixed composition.

In the implementation illustrated in FIG. 2, the wet batch process 200 includes mixing 101 the concrete mixture 4 with the $CO_2$-containing water 6 in a mixing device of a central plant to produce the ready-mixed composition 8 as defined herein.

As mentioned above, the concrete mixture includes at least a cementitious material and aggregates, and may further includes admixtures, $CO_2$-sequestering chemicals, mineral fillers, fibers and/or coloring pigments. One skilled in the art will readily understand that such mixing may be performed in a stationary mixer resulting in a ready-mixed composition that is batched to be transported onto worksite in a ready-mixed truck; or performed directly in a ready-mixed truck that receives batched amounts of the concrete mixture and $CO_2$-containing water.

Still referring to FIG. 2, the wet batch process 300 further includes transporting 110 the ready-mixed composition in a transit truck unto the work site, the ready-mixed composition being transported under the mixing conditions maintaining workability thereof. One skilled in the art will readily understand that the transit truck may be the ready-mixed truck which is mentioned above.

Both dry batch process and wet batch process further include conditioning the wet concrete mixture from the mixing device to produce a ready-to-cure concrete material, and curing the ready-to-cure concrete material to produce the carbonated concrete material containing carbon dioxide from the $CO_2$-containing water and sequestered under the form of carbonate compounds.

In some implementations, the conditioning may include discharging the wet concrete mixture onto a deposit zone of the work site. The discharging may be performed via at least one of a pump, a conveyor belt, a chute, an elephant trunk, and a discharge pipe.

In some implementations, the conditioning may further include pumping, depositing, molding, forming/shaping, compacting and/or finishing depending on the desired concrete end product.

System Implementations

Depending on embodiments of the process described herein, various embodiments of a system for the production of a wet carbonated concrete mixture may be encompassed as follows.

In one embodiment, there is provided a system for the production of the wet carbonated concrete mixture as defined herein. The system includes:
  a water feed tank providing a flow of water via an outlet thereof;
  a mixer receiving the concrete mixture;
  a feed line ensuring fluid communication between the outlet of the water feed tank and an inlet of the mixer; and
  a $CO_2$-injector mounted on the feed line upstream of the mixer for injecting carbon dioxide into the flow of water to produce a flow of $CO_2$-containing water;
wherein the flow of $CO_2$-containing water is fed to the inlet of the mixer via the feed line for mixing thereof with the concrete mixture and production of a wet carbonated concrete mixture.

In another embodiment, there is provided a ready-mixed truck for the production of the ready-mixed composition as defined herein. The ready-mixed truck includes:
  a mixing drum receiving the concrete mixture;
  a water feed line in fluid communication with the mixing drum of the ready-mixed truck; and
  a $CO_2$-injector mounted on the feed line upstream of the ready-mixed truck for injecting carbon dioxide into water flowing via the water feed line and produce a flow of $CO_2$-containing water;
wherein the flow of $CO_2$-containing water is fed to the ready-mixed truck via the water feed line for mixing thereof with the concrete mixture and production of the ready-mixed composition.

Figure 5:
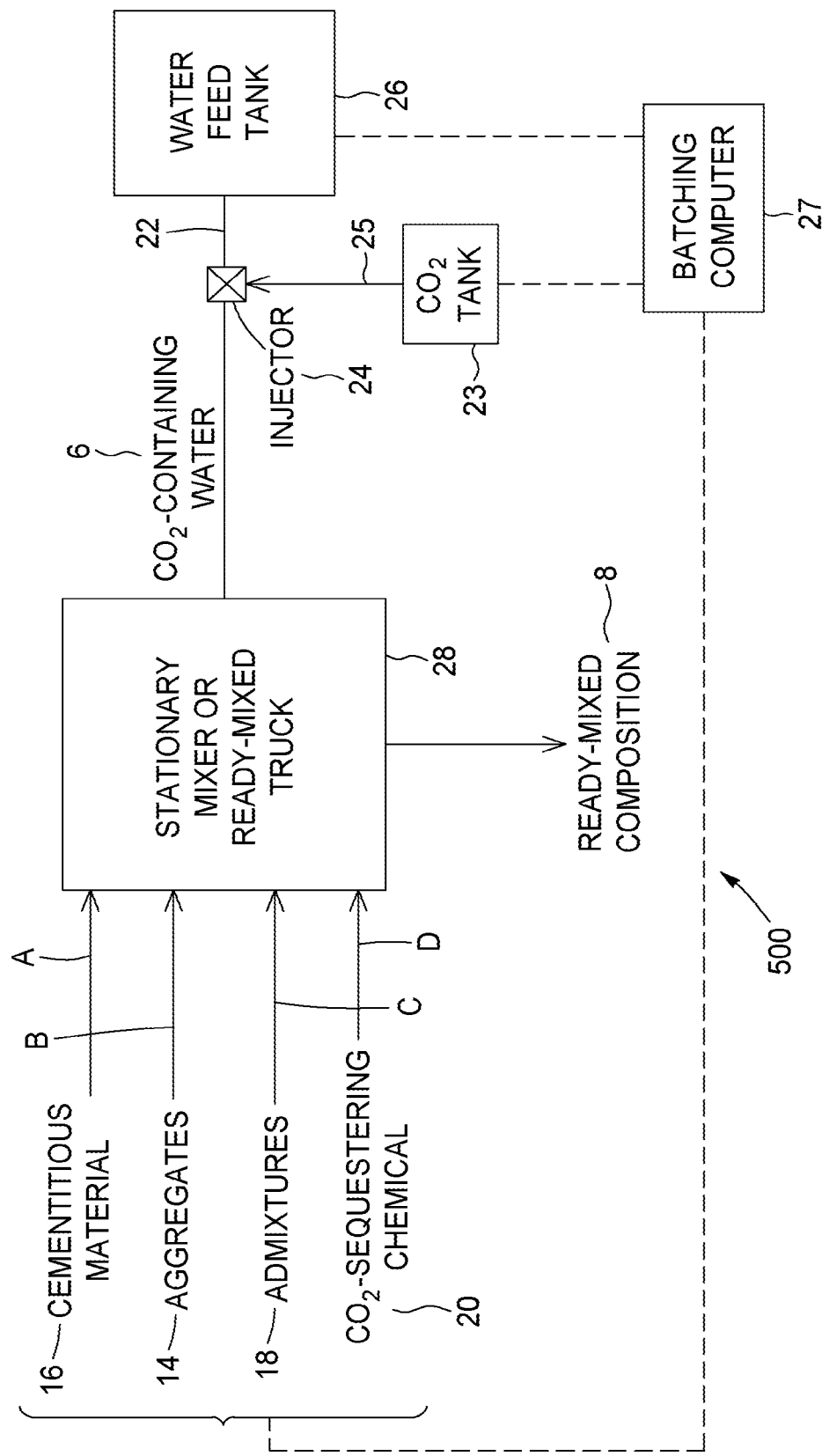
FIG. 5 is a schematic process flowchart of general steps for producing a ready-mixed composition from independently fed concrete ingredients and $CO_2$-containing water prepared by injecting $CO_2$ in a flow of water.

FIG. 5 illustrates general implementation of a system 500 including an assembly for producing the $CO_2$-containing water. The preparation of the $CO_2$-containing water 6 involves the use of a $CO_2$ injector 24 to inject $CO_2$ from a $CO_2$ tank 23 via a first feed line 25 which may be provided in fluid communication with a water feeding line 22, the water feed line 22 joining a water feed tank 26 to mixing device 28, as seen on FIG. 5. The system 500 can further include a controller or batching computer 27 simultaneously controlling the amounts of the ingredients (14, 16, 18, 20) of the concrete mixture, water 22 and $CO_2$ 25. It should be noted that the batching computer may control other parameters such as the $CO_2$ injection speed via the injector 24 or the water flow rate via a flow meter (not illustrated) operatively connected to the water feed tank 26.

The $CO_2$ injection pressure can be made compatible with the water injecting pressure to ensure $CO_2$ is efficiently blended with water and pumped into the mixing drum. For example, the $CO_2$ injection pressure may be maintained higher than the water pressure.

Figure 4:
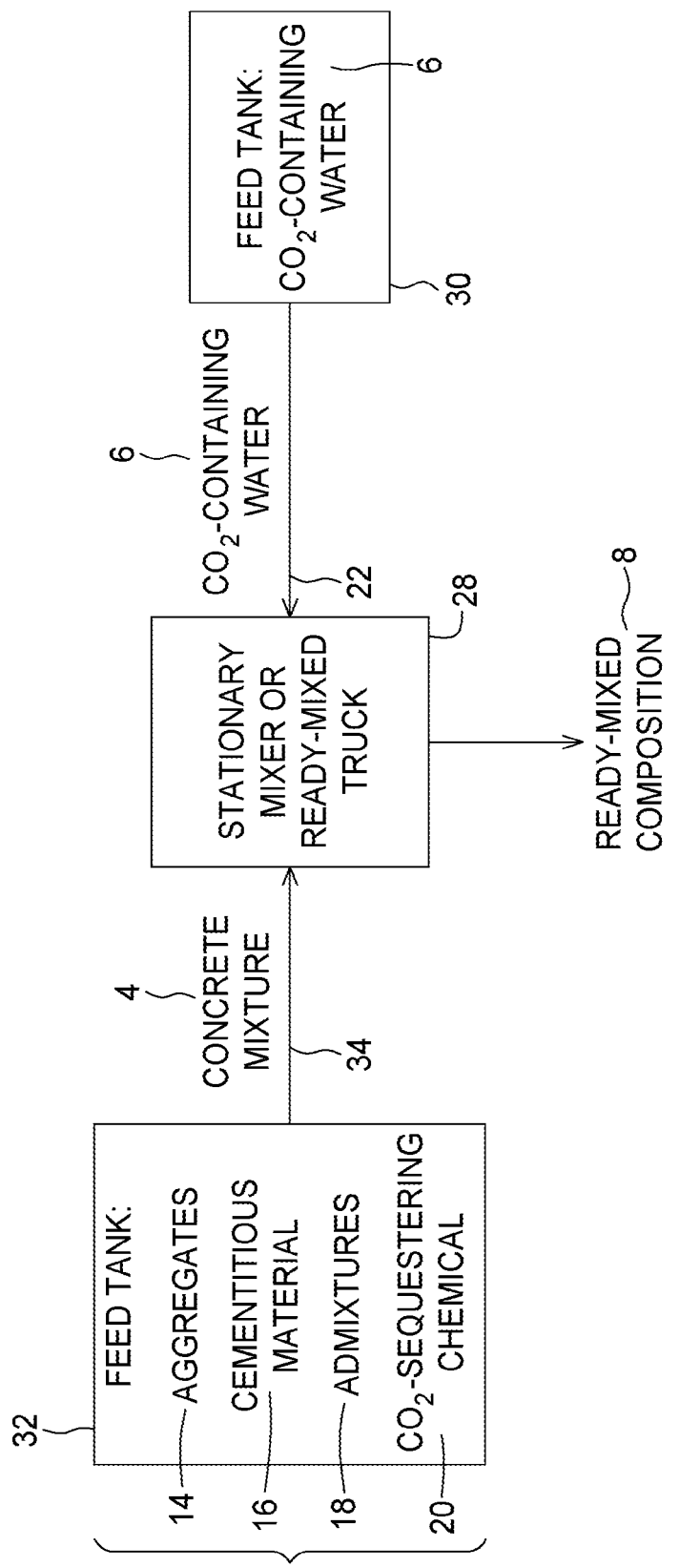
FIG. 4 is a schematic process flowchart of general steps for producing a ready-mixed composition from a concrete mixture and stored $CO_2$-containing water.

Alternatively, as seen on FIG. 4, another system 400 including a $CO_2$-containing water feed tank 30 may be used to feed the mixing device 28 via water feed line 22, the $CO_2$-containing water being prepared in advance. The $CO_2$-containing water tank 30 may be configured such that the $CO_2$-containing water 6 is stored under a minimized temperature in order to maximize the solubility of $CO_2$ in water and blending efficiency.

Various devices, machinery and operational conditions (temperature, pressure, amounts, etc.) may be used to perform preparation of the $CO_2$-containing water depending on the source of water, the physical form of the $CO_2$ and the ambient conditions of the site where the $CO_2$-containing water is prepared. For example, a $CO_2$ injector coupled with a device such as a loop reactor may be used to provide the desired $CO_2$ concentration in a flow of circulating water.

As seen in the experimental set up illustrated in FIGS. 6 and 7, the system 510 can include preparing the $CO_2$-containing water 6 before mixing with the concrete mixture (only a mixing drum 28 is illustrated in FIGS. 6 and 7). Water can be stored and fed from a water feed tank 30 and $CO_2$ may be stored and fed from a $CO_2$ tank 36. One or two $CO_2$ tank(s) 36 can be provided to adjust the time needed to reach a desired concentration of $CO_2$ in water to produce the $CO_2$-containing water 6. A flowmeter 38 can be operatively connected to the $CO_2$ tank 36 to control the $CO_2$ injection flow rate of $CO_2$ in water. Optionally, the $CO_2$ injection flow rate can be between 40 L of $CO_2$ per min to 1000 L/min, optionally between 100 L/min to 600 L/min in gas phase, or 1 L/min to 40 L/min, optionally between 5 L/min to 20 L/min in liquid phase.

The method can further include adjusting a water flow rate to the $CO_2$ injection speed to ensure that the required amount of $CO_2$ is injected before all the batched water is mixed with the concrete mixture. As the $CO_2$ can be injected at the same time as the water starts flowing, mixing time and exposure time of the concrete mixture to the flowing $CO_2$-containing water can vary and influence the chemical reactions leading to the formation of the carbonated concrete. The water flow rate can range between 10 L/minute to 1000 L/minute, preferably from 100 L/minute to 700 L/minute to cover various ranges of desired $CO_2$ concentration in the $CO_2$-containing water, in accordance with a given $CO_2$ injection speed and physical state of the injected $CO_2$ (liquid, gas, etc.).

As the process may include independently feeding the concrete ingredients to the mixing device, at least two feed lines are in fluid communication with said mixing device to provide the concrete mixture and the $CO_2$-containing water respectively.

For example, referring to FIG. 4, the system 400 includes a concrete mixture feed tank 32 including batched amount of each and everyone of the ingredients for the concrete mixture 4 (aggregates 14, cementitious material 16, optional admixtures 18 and/or optional $CO_2$-sequestering chemicals 20) which are fed to the mixing device 28 via a dedicated feed line 34 (e.g. conveyor). In another example, referring to FIG. 5, the system 500 may include independent feed lines (A to D) to feed each ingredient of the concrete mixture to the mixing device 28 independently. In other implementations, an admixture feed line in fluid communication with the mixing drum of a ready-mixed truck, which is independent from the water feed line, may be provided.

It should be understood that any one of the above-mentioned implementations or embodiments of each process, method, composition and system may be combined with any other of the aspects thereof, unless two aspects clearly cannot be combined due to their mutually exclusivity. For example, the various method steps and/or structural elements of the system described herein-above, herein-below and/or in the appended Figures, may be combined with any of the general process appearing herein-above, herein-below and/or in the appended Figures.

EXPERIMENTATION RESULTS

Several experiments have been performed according to a trial plan, according to which different wet concrete mixtures samples (referred to as mixes) have been prepared and cured, to evaluate the proposed methodologies and systems to sequester $CO_2$ into concrete by measuring the strength development of produced concrete cylinders. An experimental system was configured where one or two $CO_2$ tanks can be attached to a water container while the water flows out through an exit valve and is timed to control a flow rate thereof, as illustrated in FIGS. 6 and 7.

Standards

The following standards have been respected during experimentation and will be referred to further below.
CSA-A23.2-2C: Making Concrete Mixes in the Laboratory
CSA-A23.2-3C: Making and Curing Concrete Compression and Flexural Test Specimens
CSA-A23.2-4C: Air content of Plastic Concrete by the Pressure Method
CSA-A23.2-5C: Slump of Concrete
CSA-A23.2-9C: Compressive Strength of Cylindrical Concrete Specimens
CSA-A23.2-17C: Temperature of Freshly Mixed Hydraulic Cement Concrete
CSA-A23.2-23C: Electrical Indication of Concrete's ability to Resist Chloride Ion Penetration
C403M-16: Standard Test Method for Time of Setting of Concrete Mixtures by Penetration Resistance Materials The following materials were used for the purpose of experimentation:

Cement:
Portland Cement General Use (Type GU): Type GU (Type 1) is an all-purpose general use Portland cement that is commonly used in Canada and meets the CSA-A3001-13 specifications.

$CO_2$-Sequestering Chemicals:
CRH Slag: CRH Slag cement is a ground granulated blast furnace slag (GGBFS) which is a by-product of the steel manufacturing industry. It is known to densify the concrete matrix and enhance strength as it forms more calcium silicate hydrate which is the paste needed to hold concrete together. The CRH Slag meets the CSA-A3001-13 requirements.

Steel Slag: Steel slag is also a by-product of steel manufacturing but unlike CRH Slag, this slag is produced in a Basic Oxygen Furnace (BOF) or an Electric Arc Furnace (EAF). The hot iron is treated with lime and reacts with silicates and oxides of magnesium, manganese, and aluminum to form steel furnace slag. Once cooled and processed, the steel slag can be sized into desired products. Table 1 gives some of the wide range of chemical composition of steel slag:

TABLE 1

| Chemical Composition of Steel Slag | | | | | | | | | | |
|---|---|---|---|---|---|---|---|---|---|---|
| Comp. | CaO | $Al_2O_3$ | FeO | MgO | $SiO_2$ | $SO_3$ | MnO | $TiO_2$ | $P_2O_5$ | $Fe_2O_3$ |
| Range (%) | 30-60 | 1-12 | 10-35 | 1-15 | 10-20 | 0.1-0.6 | 0.3-8 | 0.4-2 | 0-1.5 | 10-38 |

Lime: Hydrated lime that is normally used for curing concrete in tanks is also used as a raw material in some of the concrete mixes.

Aggregates:
Limestone: 19 mm limestone is used as coarse aggregate in this study and meets the OPSS 1001 material specification for aggregates.

Sand: The concrete sand used throughout this study meets the OPSS 1001 requirements for aggregates.

Admixture:
Water Reducer: Eucon WR is used as a water reducer throughout this study which is a solution of lignosulfonate. It creates a plastic and cohesive mix that gives durability, reduced shrinkage, and less permeability in concrete. The water reducer meets the C494/C494M standard specification for chemical admixtures for concrete.

Carbon dioxide: Food grade certified $CO_2$ is used.

General Procedure

Based on the mix design and trial plan, specific amounts of cement, slag, sand, and aggregates were batched. Lime was also batched according to the trial plan for certain mixes. Some mixes also included steel slag instead of regular CRH slag.

The proportioning of the raw materials per cubic meter of concrete consists of the following:

| | Kg/m³ | | | | | ml/100 kg of Cement | % of Total Cement |
|---|---|---|---|---|---|---|---|
| GU | CRH Slag | Sand | Limestone | Water | CO₂ | Water Reducer | by Weight Lime |
| 234 | 41 | 922 | 1070 | 165 | Varies | 250 | Varies |

The moisture content of the sand was measured, and the weight of the batched sand was adjusted by adding or removing sand from the concrete mix drum based on the measured moisture content. Water reducer was also batched based on the trial plan and the batched materials are placed in a concrete mixer drum. The water amount was determined by the moisture content and carbonated water was prepared via the one-tank or two-tank systems that will be described in the following sections. Once all the materials were placed in the concrete mixer drum, the mixing process is started according to CSA-A23-2C standard, while the mixing and resting time were adjusted based on trial plan.

Traditional Flake Injection (Comparative)

The first stage of the study consisted of directly adding $CO_2$ flakes into the concrete ingredients and water. After the cement, sand, aggregate, water, and admixture is added into the mixer drum and started, $CO_2$ flakes are then added so that they are directly in contact with the concrete. The mixer is run until the standard mixing time is completed. Cylinders are casted, cured, and test as per CSA-A23.2-9C.

One-Tank System

Referring to FIG. 6, this system 510 involves a custom made 10-L water tank 30 with an exit valve 42 attached to a T-shaped ball valve connector. The water tank has an opening on top which is used to fill the required amount of water (not illustrated in FIG. 6). A $CO_2$ hose is inserted in one of the T-valve connectors (becoming $CO_2$ valve 40) and the top of the water tank is closed. The $CO_2$ flow rate is set to a constant rate of 50 ft³/hr. The $CO_2$ valve 40 is open and the water exit valve 42 is opened once the $CO_2$ tank 36 is stable at the set flow rate. The time is calculated when the water starts dropping into the mixture. The $CO_2$ should be exposed to the water for an exposition time required to achieve the desired $CO_2$ concentration level in the $CO_2$-containing water. The $CO_2$-containing water trickles down via the pressure exerted by the incoming $CO_2$ gas through the hose, and falls into the mixer. Once the exposition time is over, the $CO_2$ valve 40 is closed along with the exit water valve 42. The amount of water remaining in the water tank 30 is then poured down in the concrete mixture directly from the top opening of the water tank 30 into the mixing drum 28. The mixing is performed for a total of 10 minutes initially, followed by a 2-minute rest, and 3 minutes of final mixing.

Cylinders of carbonated concrete are casted and cured from the ready-to-cure mixture produced via such mixing, and strength and plastic performance of the carbonated concrete is tested as per CSA-A23.2-9C.

The flow rate of $CO_2$-containing water fed to the mixing drum can therefore vary according to the injection rate of $CO_2$ within water. For example, if the desired $CO_2$ concentration is reached slowly, the flow rate of $CO_2$-containing water fed to the mixing drum will also be slow, thereby forcing the mixing time to be elongated such that the needed quantity of $CO_2$-containing water be mixed with the concrete ingredients from the mixing drum.

Two-Tank System

This two-tank system 512 uses the same custom made 10-L water tank as for the one-tank system 510. The only difference is that two $CO_2$ tanks 36 are connected in the T-shaped ball valve connector. The same procedure is followed as per the one-tank system 510 and the $CO_2$ injection flow rate from the second $CO_2$ tank 36 is also set at 50 ft³/hr. The system 512 enables that the exposition time required to achieve the desired $CO_2$ concentration in the $CO_2$-containing water 6 decreases by half as much as it was with the one-tank system 510.

Experimental Results

One-Tank System

Production of different wet concrete mixtures were conducted using the tank system 510 illustrated in FIG. 6 to regulate the $CO_2$ gas so that leakage does not occur and $CO_2$-containing water 6 goes directly into the mixing drum 28. Five mixes were produced via mixing of batched concrete mixture with $CO_2$-containing water having 0 (reference), 20, 40, 60, and 80 g of $CO_2$ per liter of water respectively (2.4, 4.8, 7.2, and 9.6 kg/m³ of concrete).

Figure 8:
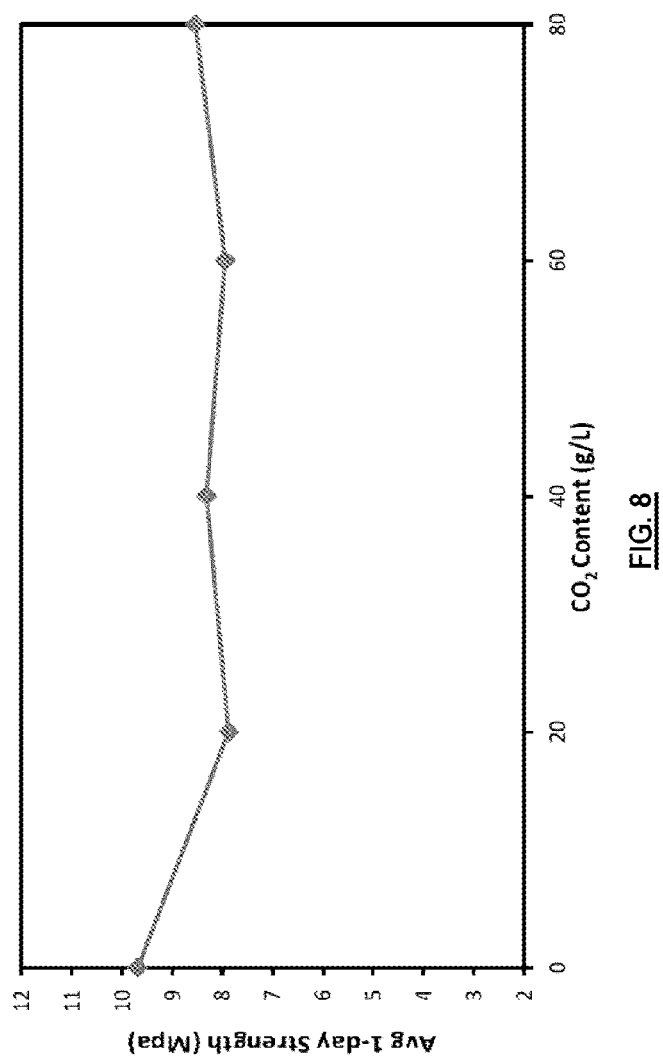
FIG. 8 is a graph of the average one-day compressive strength (in MPa) of concrete cylinders versus the content of $CO_2$ in the $CO_2$-containing water (in g/L) for preparation thereof using the one-tank system of FIG. 6.
Figure 9:
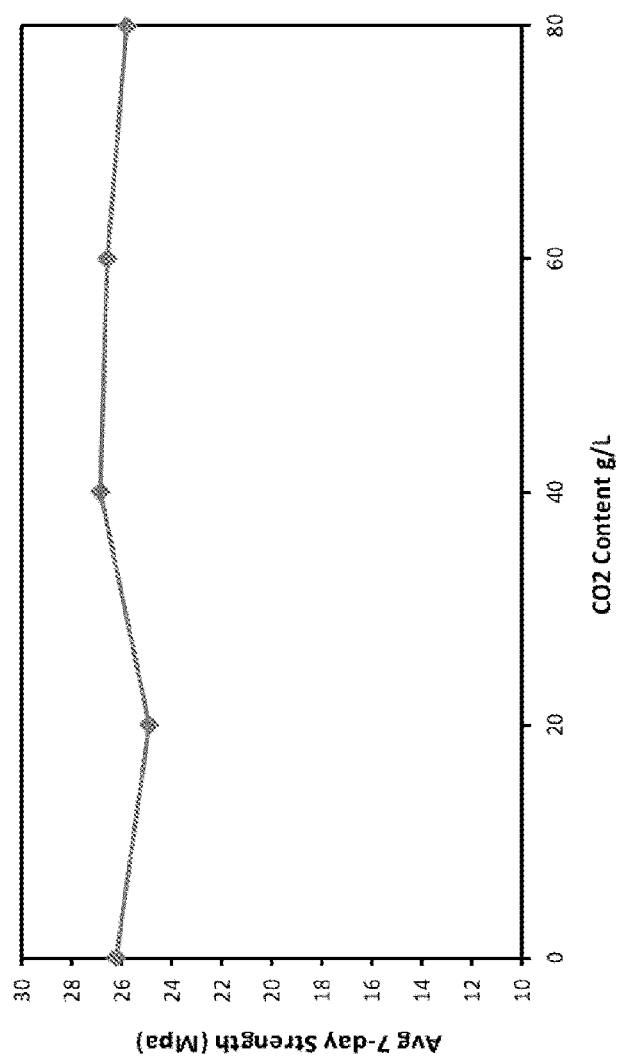
FIG. 9 is a graph of the average seven-day compressive strength (in MPa) of concrete cylinders versus the content of $CO_2$ in the $CO_2$-containing water (in g/L) for preparation thereof using the one-tank system of FIG. 6.
Figure 10:
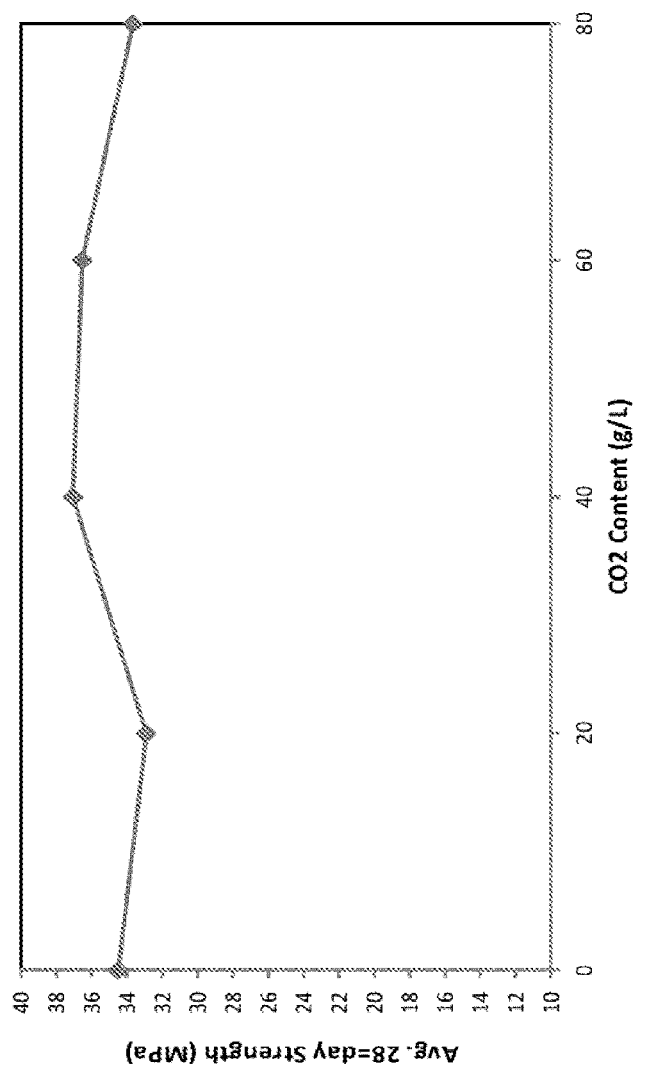
FIG. 10 is a graph of the average twenty-eight-day compressive strength (in MPa) of concrete cylinders versus the content of $CO_2$ in the $CO_2$-containing water (in g/L) for preparation thereof using the one-tank system of FIG. 6.

Table 2 and FIGS. 8 to 10 summarize the results of the CSA-A23.2-9C test.

Referring to FIG. 8, 1-day compressive strength for the reference mix was higher than for all other mixes. Upon increasing the $CO_2$ level in the $CO_2$-containing water during preparation of the mix, the compressive strength of the resulting carbonated concrete cylinder slightly decreases and fluctuate around 8 MPa. Referring to FIGS. 9 and 10, by day 7 and 28, the strengths for mixes with 40 (4.8 kg/m³) and 60 g/L $CO_2$ (7.2 kg/m³) were the highest and turned out to be the optimum dose in the experimental conditions. FIGS. 9 and 10 further show that even at the highest dose of 80 g/L (9.6 kg/m³), the compressive strength was comparable to the reference mix. This system showed that higher doses of $CO_2$ could be sequestered as the strengths were comparable to the reference mix.

However, the one-tank system only allowed for slow carbonation of water to produce the $CO_2$-containing water since the flow rate of $CO_2$ could not exceed 50 ft³/hr per tank. Such flow rate for $CO_2$ injection resulted in an increased mixing time as the $CO_2$-containing water slowly dripped in the mixing drum to allow the desired carbonation level to be reached. Injection flow rate of $CO_2$ can therefore be a challenge, especially in plant operation conditions as the concrete mixture are batched quickly in comparison to the time required for the water to reach the desired carbonation level.

TABLE 2

Average Strengths for Concrete Mixes with One-Tank System
One Tank System

| CO2 in Water (g/L) | CO2 (kg/m³) in Concrete | Avg. 1-Day Strength (MPa) | Avg. 7-Day Strength (MPa) | Avg. 28-Day Strength |
|---|---|---|---|---|
| 0 | 0 | 9.68 | 26.22 | 34.48 |
| 20 | 2.4 | 7.87 | 24.90 | 32.90 |
| 40 | 4.8 | 8.31 | 26.85 | 37.06 |
| 60 | 7.2 | 7.94 | 26.58 | 36.52 |
| 80 | 9.6 | 8.53 | 25.80 | 33.65 |

Two-Tank System

The same five mixes were prepared by using the two-tank system as illustrated in FIG. 7. Another $CO_2$ tank 36 was connected to a second inlet valve 44 and set to 50 ft³/hr of injected $CO_2$. The total $CO_2$ injection rate was therefore doubled with respect to the one-tank system by reaching 100 ft³/hr. Table 3 and FIGS. 11 to 13 summarize the results of the CSA-A23.2-9C test with respect to concrete cylinders prepared from said mixes.

Figure 11:
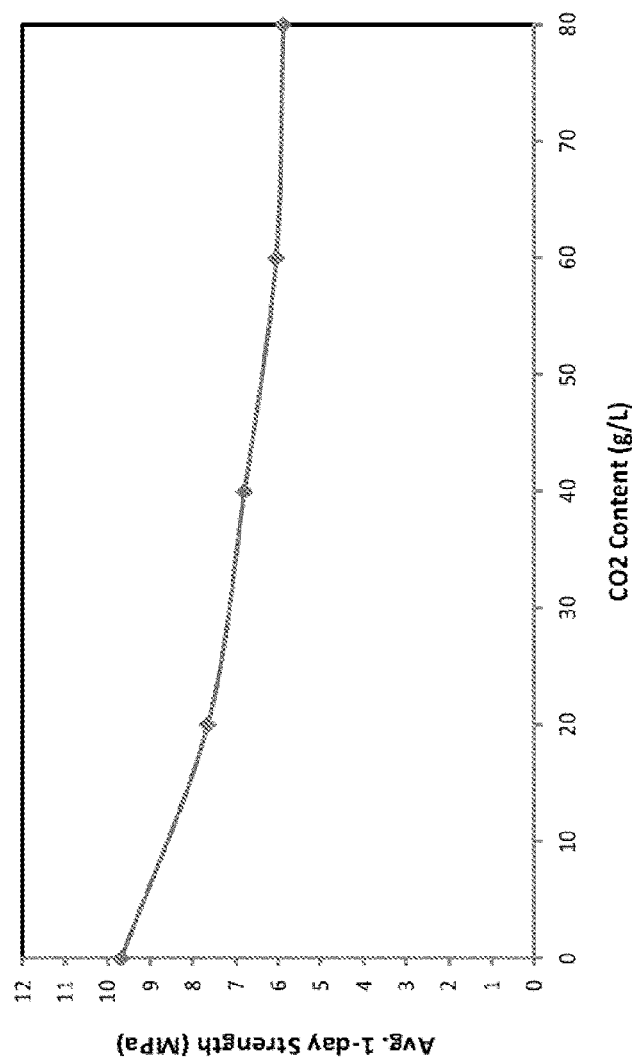
FIG. 11 is a graph of the average one-day compressive strength (in MPa) of concrete cylinders versus the content of $CO_2$ in the $CO_2$-containing water (in g/L) for preparation thereof using the two-tank system of FIG. 7.
Figure 12:
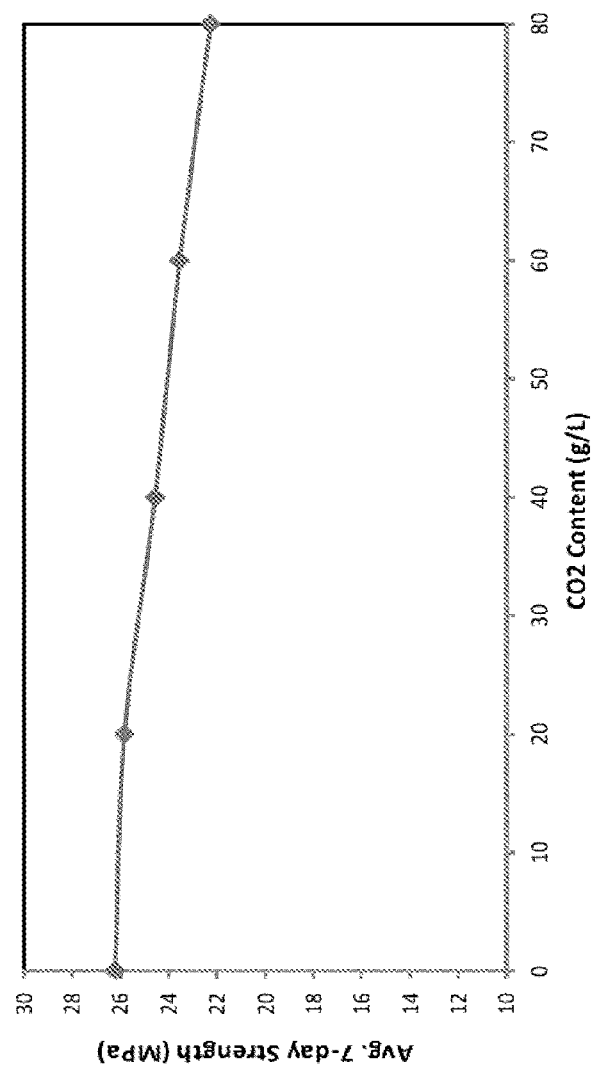
FIG. 12 is a graph of the average seven-day compressive strength (in MPa) of concrete cylinders versus the content of $CO_2$ in the $CO_2$-containing water (in g/L) for preparation thereof using the two-tank system of FIG. 7.
Figure 13:
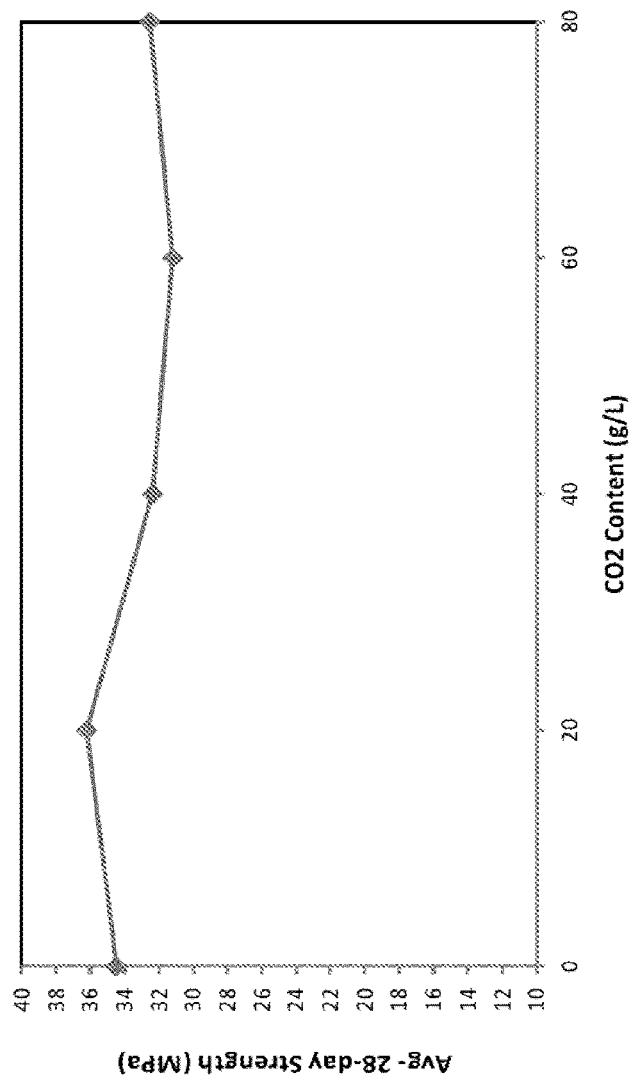
FIG. 13 is a graph of the average twenty-eight-day compressive strength (in MPa) of concrete cylinders versus the content of $CO_2$ in the $CO_2$-containing water (in g/L) for preparation thereof using the two-tank system of FIG. 7.

Referring to FIGS. 11 and 12, a decreasing trend in compressive strength is seen as the $CO_2$ concentration is increased for 1-day and 7-day strength. For the 28-day strength shown in FIG. 13, the strength was similar for 40, 60, and 80 g/L $CO_2$(4.8, 7.2, and 9.6 kg/m³) while the highest strength was observed for 20 g/L (2.4 kg/m³) $CO_2$. Therefore, at an increased injection rate, the optimal dose has decreased to 20 g/L (in comparison with FIG. 10), which gives about 5% increase in strength relative to reference mix after 28-days. Upon injecting more $CO_2$, the 28-day strength decreased as seen on FIG. 13. As seen on FIG. 11, the highest 1-day strength was achieved with the reference mix while the lowest strength of 5.88 MPa was achieved at 80 g/L (9.6 kg/m³) $CO_2$.

TABLE 3

Average Strengths for Concrete Mixes with Two-Tank System
Two Tank System

| CO₂ (g/L) | CO₂ (kg/m³) in Concrete | Avg. 1-Day Strength | Avg. 7-Day Strength (MPa) | Avg. 28-Day Strength (MPa) |
|---|---|---|---|---|
| 0 | 0 | 9.68 | 26.22 | 34.48 |
| 20 | 2.4 | 7.65 | 25.84 | 36.21 |
| 40 | 4.8 | 6.79 | 24.56 | 32.37 |
| 60 | 7.2 | 6.04 | 23.55 | 31.20 |
| 80 | 9.6 | 5.88 | 22.26 | 32.54 |

Two tanks can advantageously be used to inject higher concentrations of $CO_2$ in water in lesser time (than for the one tank system) to achieve more carbonation and to ensure the process replicates in plant since plant operations require quick batching of materials. However, the results indicate that increasing the injection speed can decrease the overall strength with increasing $CO_2$ concentration. In the experimental set-up, when the concentration of $CO_2$ is reached quicker via the use of two tanks, the water flow rate can be increased, which leads to mixing the concrete ingredients with a same amount of $CO_2$-containing water in a lesser time (in comparison to the one-tank system). The 7-day and 28-day strengths at 20 g/L $CO_2$ (2.4 kg/m³) was the mix that obtained higher strength than the reference mix which indicates that lower concentrations of $CO_2$ might be suitable in this process. Therefore, at lower speeds, higher doses yield higher strengths while faster injection results in lower optimal dosage. Hence, it is necessary to maintain a balance between injection speeds, $CO_2$ dosage and water flow rate.

Lime Addition and Two-Tank System

Figure 14:
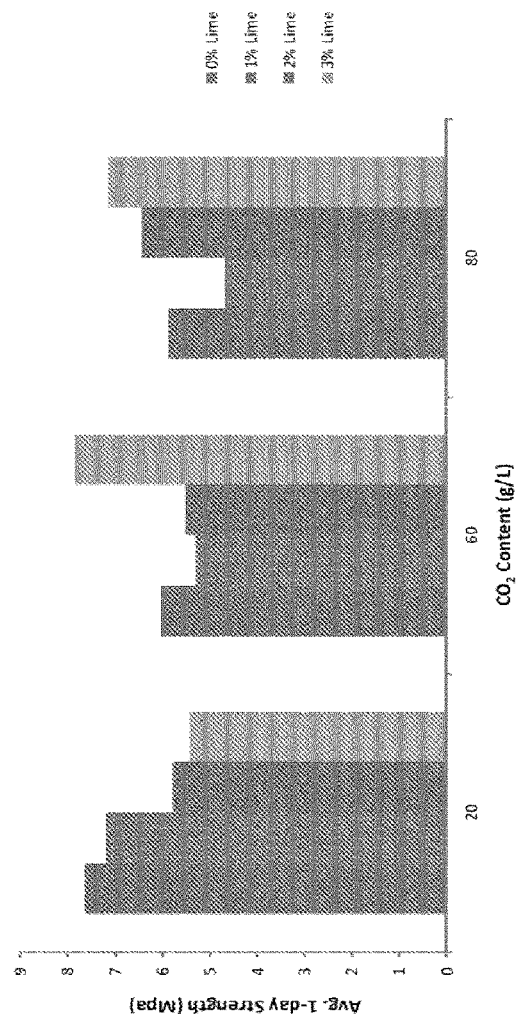
FIG. 14 is a graph of the average one-day compressive strength (in MPa) of concrete cylinders versus the content of $CO_2$ in the $CO_2$-containing water (in g/L) with varying lime content for preparation thereof using the two-tank system of FIG. 7.
Figure 15:
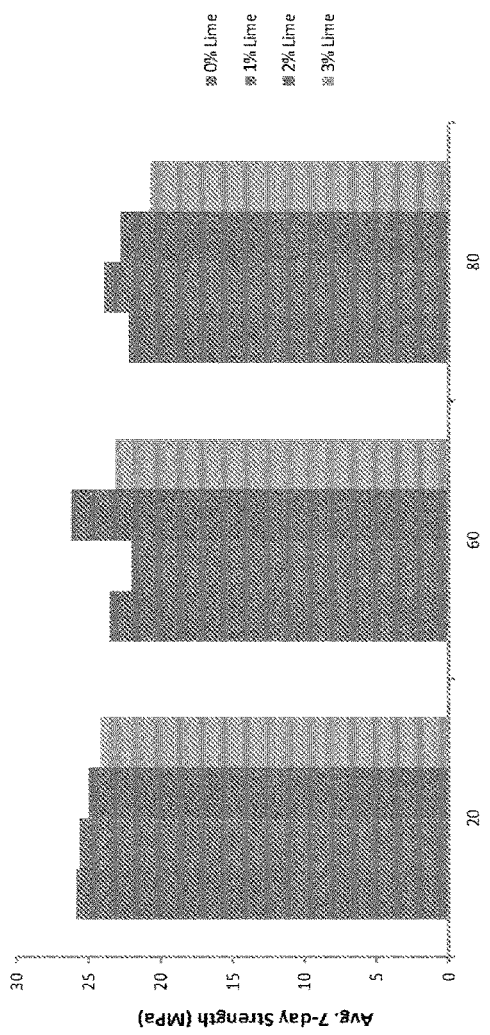
FIG. 15 is a graph of the average seven-day compressive strength (in MPa) of concrete cylinders versus the content of $CO_2$ in the $CO_2$-containing water (in g/L) with varying lime content for preparation thereof using the two-tank system of FIG. 7.
Figure 16:
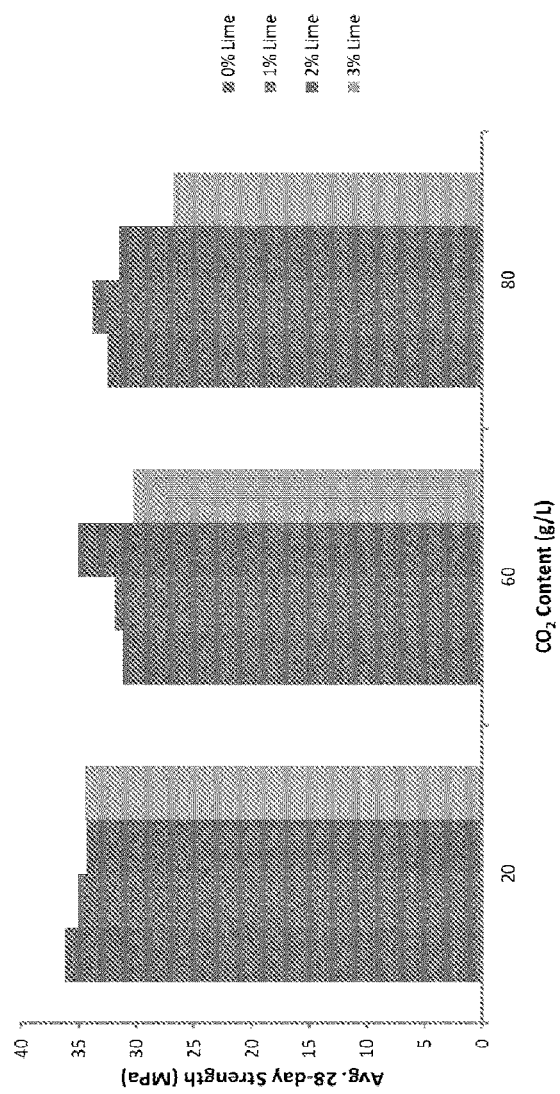
FIG. 16 is a graph of the average twenty-eight-day compressive strength (in MPa) of concrete cylinders versus the content of $CO_2$ in the $CO_2$-containing water (in g/L) with varying lime content for preparation thereof using the two-tank system of FIG. 7.

Referring to Table 4 and FIGS. 14 to 16, 1%, 2%, 3% of lime (by weight of total cement) was added to another set of newly prepared mixes to evaluate whether chemical reaction between carbonated water and lime would impact the compressive strength of the resulting concrete. Referring to Table 4 and FIG. 14, the 1-day strength for the mix with 1% lime with 20 g/L $CO_2$ (2.4 kg/m³) concentration was higher than for the mixes with 2% and 3% lime, but significantly decreased with increasing $CO_2$ content. Referring to FIGS. 14 and 15, concrete mix with 2% lime at 1-day showed an increase in strength at 80 g/L (9.6 kg/m³) $CO_2$ compared to the strength at 20 g/L, but at 7-days the strength at 80 g/L was much lower than that at 20 g/L. Referring to FIG. 16, at 28-day strength, it was interesting to note that at 3% lime the strengths at higher $CO_2$ dosage were much lower than those at 1% and 2% lime content.

The findings suggest that the speed of injection can have a negative impact on the strength development of the resulting concrete cylinders, which can be counterbalanced with the use of $CO_2$-sequestering chemicals. Compared to both the reference mix and the mixes without lime at 60 g/L and 80 g/L, the results show that the strength is slightly higher with 2% lime at high doses of $CO_2$. The results indicate that there is a slightly positive impact at 2% lime, suggesting that the objective of sequestering more $CO_2$ can be achieved at low lime content while increasing the lime to 3% results in decreasing the strength. Overall, the reaction of lime in the mix was sensitive when combined with $CO_2$ water.

TABLE 4

Average Strengths for Concrete Mixes with Varying Lime Content using Two-Tank System

| | | Two-Tank System | | | |
|---|---|---|---|---|---|
| Lime (%) | $CO_2$ (g/L) | $CO_2$ (kg/m³) in Concrete | Avg. 1-Day Strength (MPa) | Avg. 7-Day Strength (MPa) | Avg. 28-Day Strength (MPa) |
| 1 | 20 | 2.4 | 7.20 | 25.67 | 35.09 |
|   | 60 | 7.2 | 5.31 | 22.04 | 31.90 |
|   | 80 | 9.6 | 4.69 | 23.97 | 33.82 |
| 2 | 20 | 2.4 | 5.79 | 25.00 | 34.32 |
|   | 60 | 7.2 | 5.52 | 26.22 | 35.10 |
|   | 80 | 9.6 | 6.44 | 22.81 | 31.52 |
| 3 | 20 | 2.4 | 5.43 | 24.18 | 34.46 |
|   | 60 | 7.2 | 7.85 | 23.16 | 30.26 |
|   | 80 | 9.6 | 7.15 | 20.77 | 26.81 |

Steel Slag Addition and Two-Tank System

To test if low reactive lime would impact the compressive strength of concrete mixes with carbonated water, steel slag was used as a replacement of CRH slag in some of the mixes. Steel slag primarily consists of limestone, silica, alumina, magnesium oxide, and some sulphur. Concrete mixes were produced using the two-tank system with a fixed $CO_2$ content of 60 g/L (7.2 kg/m³). Table 5 highlight the mixes that were produced.

TABLE 5

| At 60 g/L $CO_2$ (7.2 kg/m³) | | | |
|---|---|---|---|
| Mix No. | GU (%) | CRH Slag (%) | Steel Slag (%) |
| 1 | 100 | 0 | 0 |
| 2 | 85 | 15 | 0 |

TABLE 5-continued

| At 60 g/L $CO_2$ (7.2 kg/m³) | | | |
|---|---|---|---|
| Mix No. | GU (%) | CRH Slag (%) | Steel Slag (%) |
| 3 | 95 | 0 | 5 |
| 4 | 90 | 0 | 10 |

Figure 17:
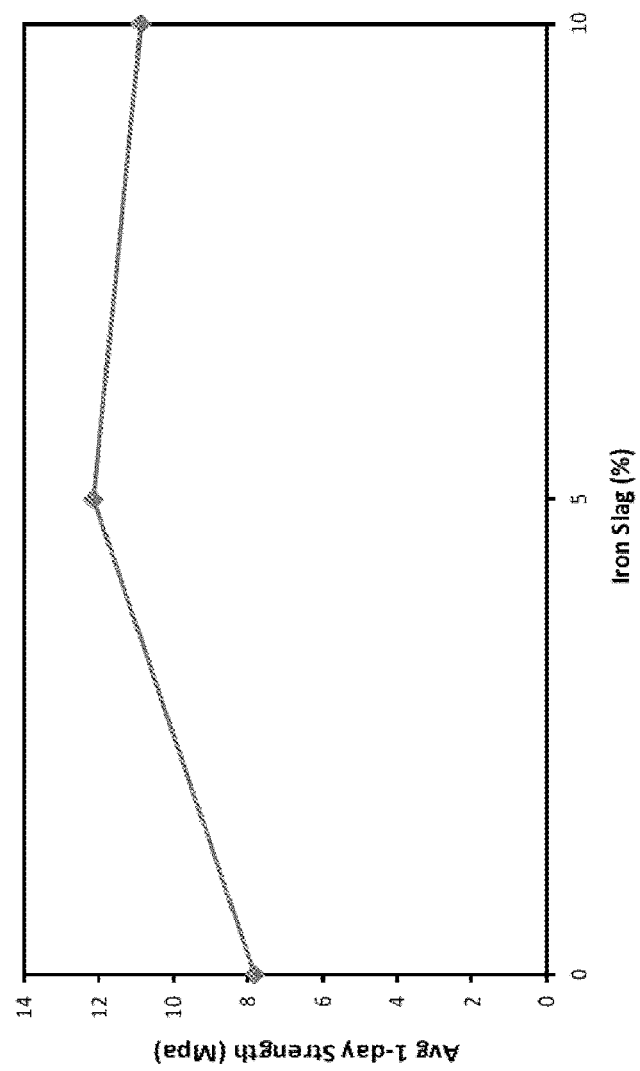
FIG. 17 is a graph of the average one-day compressive strength (in MPa) of concrete cylinders versus the content of iron slag (in %) for preparation thereof using the two-tank system of FIG. 7.
Figure 18:
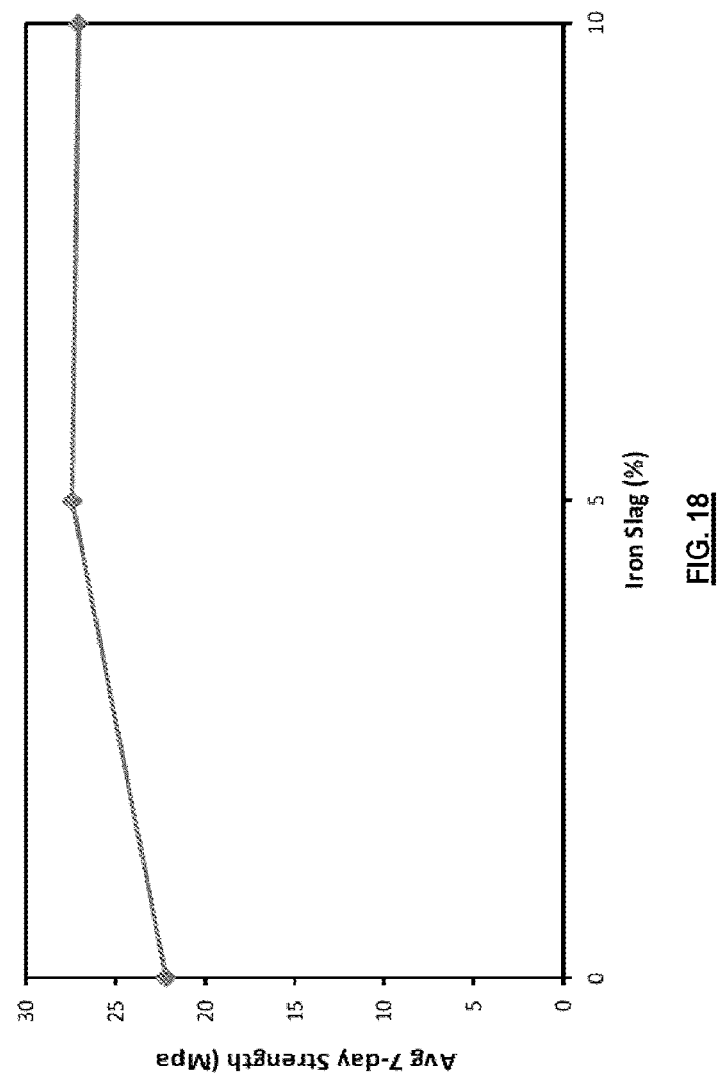
FIG. 18 is a graph of the average seven-day compressive strength (in MPa) of concrete cylinders versus the content of iron slag (in %) for preparation thereof using the two-tank system of FIG. 7.
Figure 19:
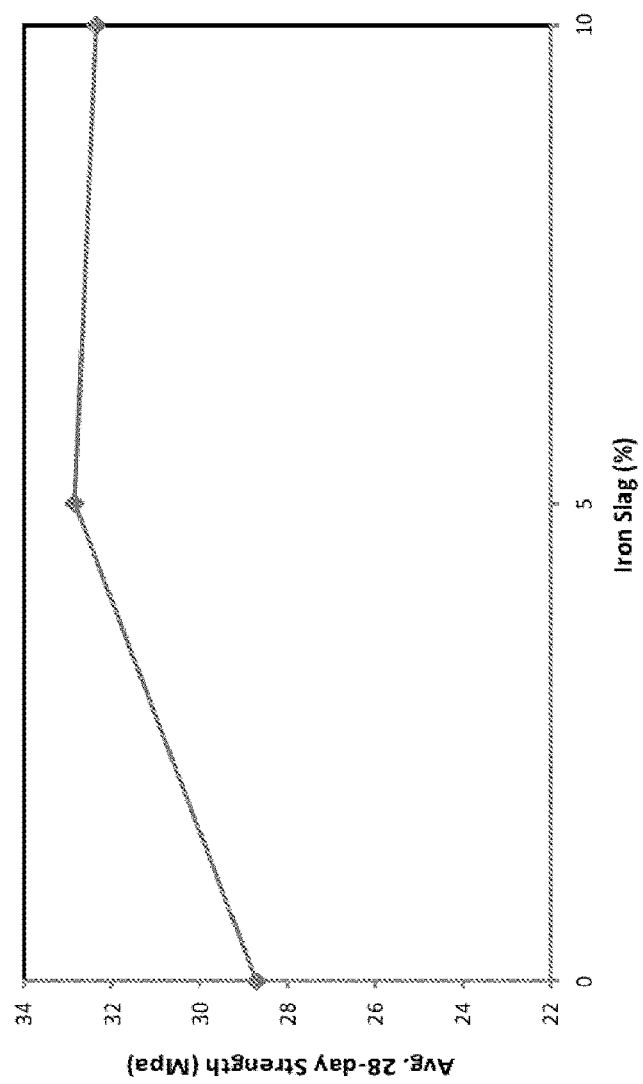
FIG. 19 is a graph of the average twenty-eight-day compressive strength (in MPa) of concrete cylinders versus the content of iron slag (in %) for preparation thereof using the two-tank system of FIG. 7.

Referring to Table 6 and FIGS. 17 to 19, the compressive strength results indicate that the mix containing 5% steel slag achieved the highest strength. Concrete mix consisting of purely GU cement had the lowest strength while the strength of the mix containing 10% steel slag was comparable to the one containing 5% at 7-days and 28-days. At 1-day, the strength of the 5% mix was considerably higher. Compared to the reference mix with 15% CRH slag, the 28-day strength is also slightly higher with steel slag. These results conclude that the use of steel slag can improve early strength in certain conditions and that an optimum dose can be found (for example 5% in the experimental conditions).

TABLE 6

Average Strengths for Concrete Mixes with Different Steel Slag Content

| | | At 60 g/L $CO_2$ (7.2 kg/m³) | | |
|---|---|---|---|---|
| Steel Slag (%) | CRH Slag | Avg. 1-Day Strength (MPa) | Avg. 7-Day Strength (MPa) | Avg. 28-Day Strength (MPa) |
| 0 | 0 | 7.82 | 22.18 | 28.70 |
| 0 | 15 | 6.04 | 23.55 | 31.20 |
| 5 | 0 | 12.15 | 27.42 | 32.85 |
| 10 | 0 | 10.87 | 27.07 | 32.36 |

Traditional Flakes Injection

Figure 20:
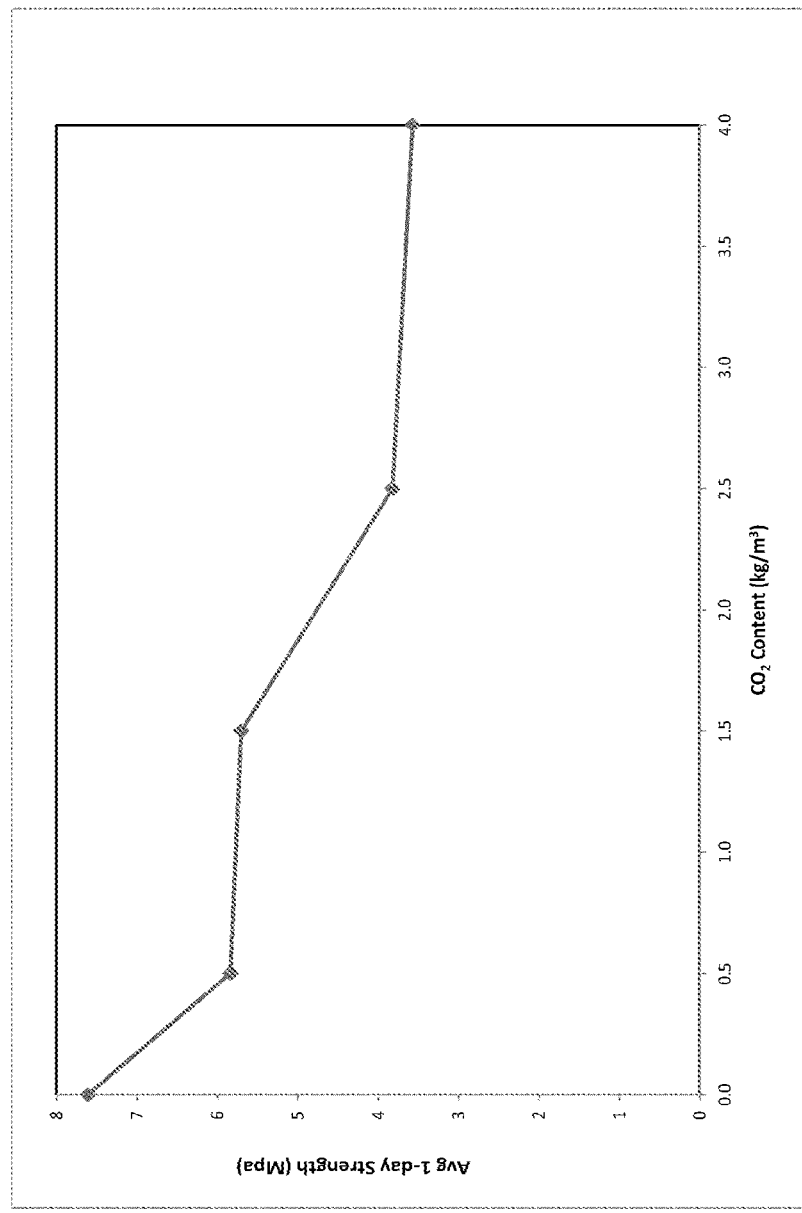
FIG. 20 is a graph of the average one-day compressive strength (in MPa) of concrete cylinders (prepared with $CO_2$ flakes) versus the content of $CO_2$ using $CO_2$ flakes for preparation thereof.
Figure 21:
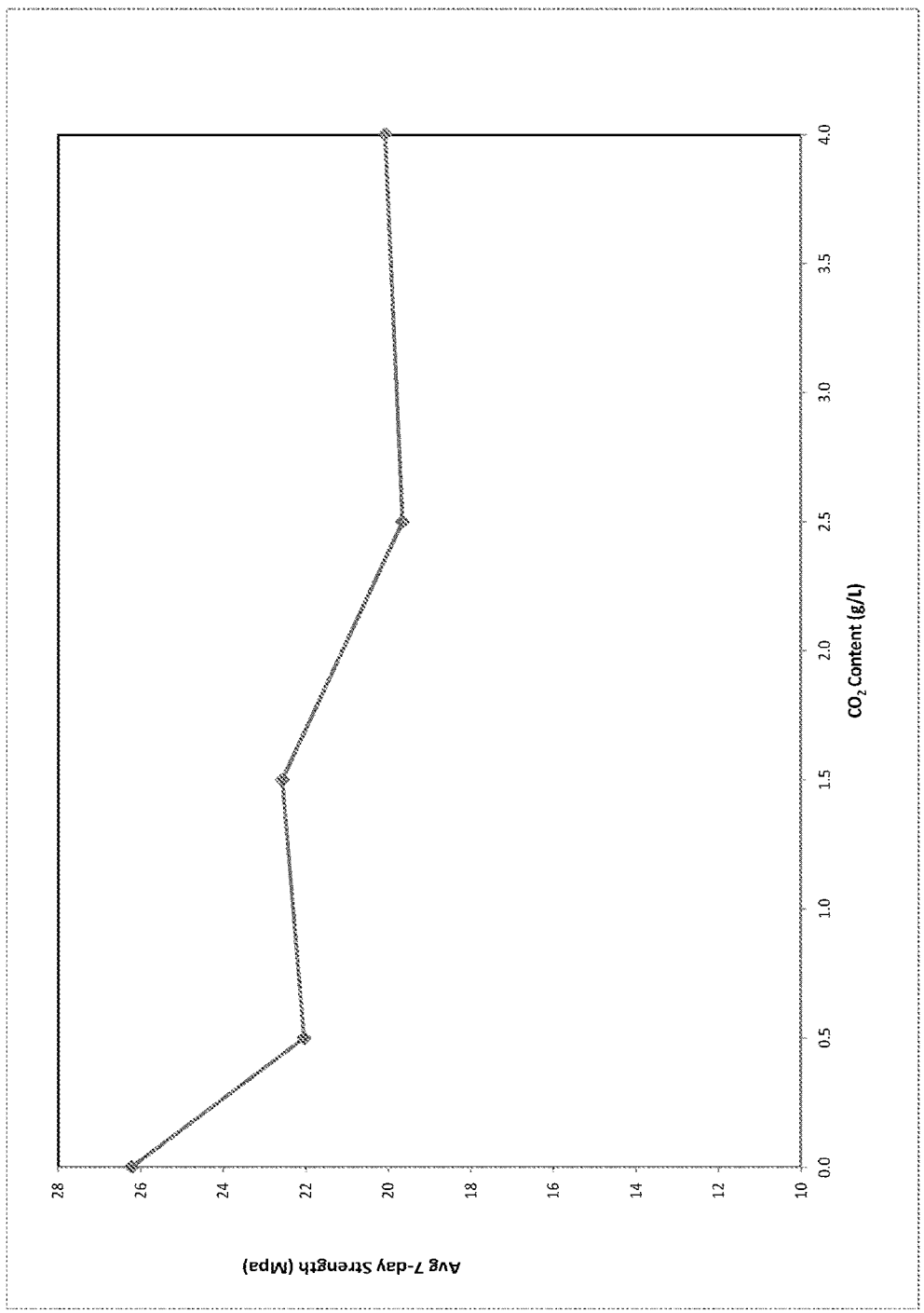
FIG. 21 is a graph of the average seven-day compressive strength (in MPa) of concrete cylinders (prepared with $CO_2$ flakes) versus the content of $CO_2$ using $CO_2$ flakes for preparation thereof.
Figure 22:
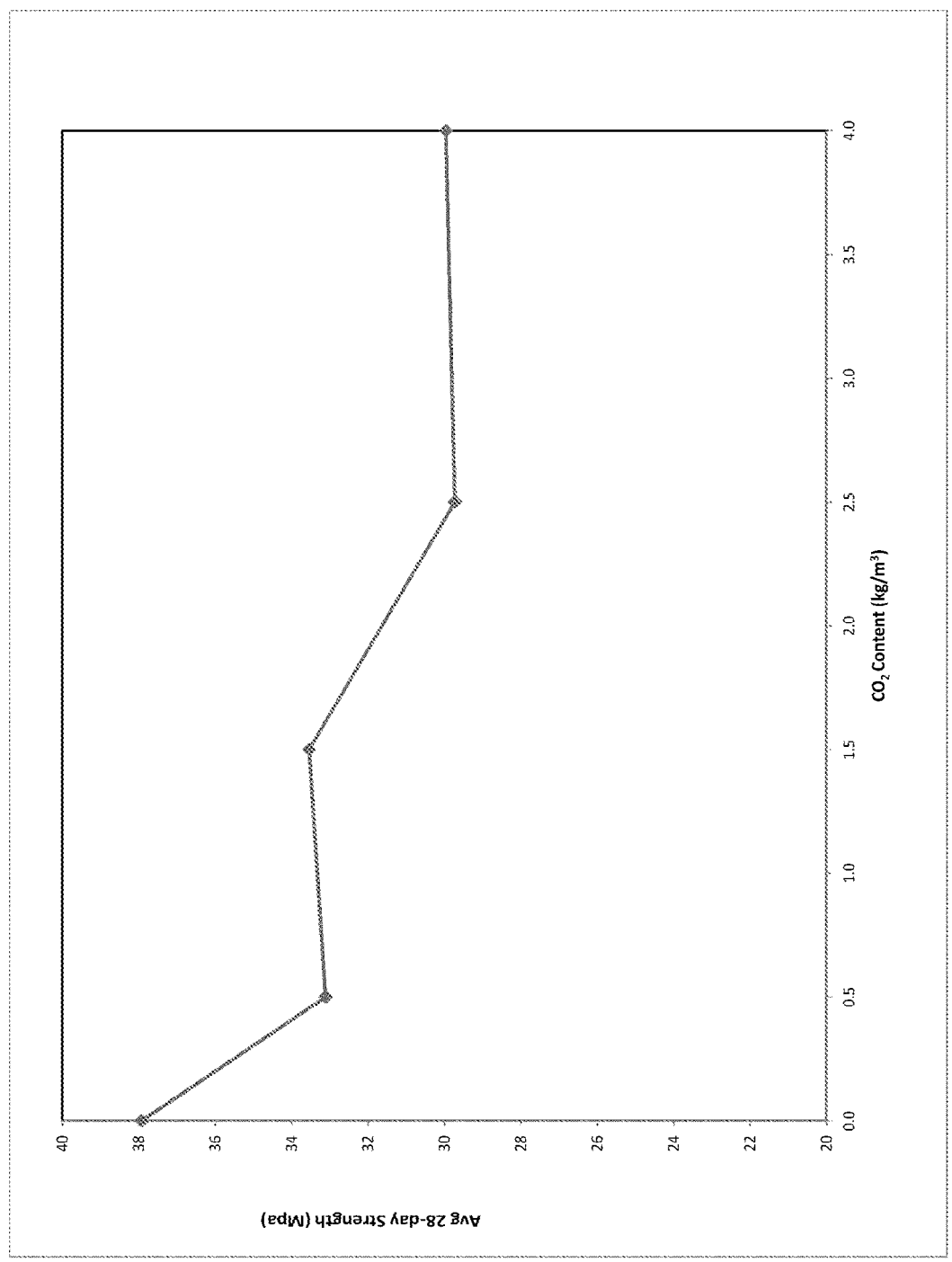
FIG. 22 is a graph of the average twenty-eight-day compressive strength (in MPa) of concrete cylinders (prepared with $CO_2$ flakes) versus the content of $CO_2$ using $CO_2$ flakes for preparation thereof.

Table 7 and FIGS. 20, 21, and 22 summarize the results of the mixes conducted by mixing $CO_2$ flakes to a wet concrete mixture.

TABLE 7

Average Strengths for Concrete Mixes with $CO_2$ Flakes
$CO_2$ Flakes in Concrete

| $CO_2$ (kg/m³) in Concrete | Avg. 1-Day Strength (MPa) | Avg. 7-Day Strength (MPa) | Avg. 28-Day Strength (MPa) |
| --- | --- | --- | --- |
| 0 | 9.68 | 26.22 | 34.48 |
| 0.5 | 5.84 | 22.05 | 33.12 |
| 1.5 | 5.71 | 22.57 | 33.54 |
| 2.5 | 3.83 | 19.66 | 29.73 |
| 4.0 | 3.58 | 20.08 | 29.97 |

The results show that the addition of $CO_2$ flakes directly on top of the concrete mix significantly decreased the concrete compressive strength. For 1-day results, the reference mix had the highest strength of 7.62 MPa while it went down to 3.58 MPa at a $CO_2$ level of 4 kg/m³. The decreasing trend continuing at 28-days as well where the reference mix had strength of 37.93 MPa while the mix with 4 kg/m³ $CO_2$ had a strength of 29.97 MPa. The mixes with 0.5 and 1.5 kg/m³ $CO_2$ had relatively similar strengths.

These results indicate at lower doses of $CO_2$ and up to 1.5 kg/m³, the strength development at 28-days was similar to that of the reference mixes. Early strength data at 1-day and 7-days shows that lower doses also yield slow strength development. $CO_2$ content higher than 1.5 kg/m³ results in lower strengths at both early and later stages. These results prove that adding $CO_2$ flakes directly into the concrete surface can only be achieved at low dosages to avoid compromising the strength development while high doses will result in significant strength development reduction.

SUMMARY

The first phase of the study proved that the traditional way of adding $CO_2$ flakes on top of concrete reduced the strength development at all ages, with the impact on strength was significant at $CO_2$ doses higher than 1.5 kg/m³. The initial investigation using one tank of $CO_2$ showed that 40 g/L and 60 g/L (4.8 and 7.2 kg/m³) were the optimum doses of $CO_2$ where the strengths were higher than reference mix at 28-days. This system showed that even higher doses of $CO_2$ could be sequestered as the strengths were comparable to the reference mix. However, the slow process of carbonation could not be replicated in plant due to challenging operations. This led to the use of another tank to speed up the process and increase carbonation. The results showed a decreasing trend of strength with increasing $CO_2$ content, except at 20 g/L (2.4 kg/m³) where the 28-day strength was higher than the reference mix. This implies that this methodology could be utilized for lower doses of $CO_2$. In all cases, 1-day strength decreased with the addition of $CO_2$. Furthermore, the addition of lime showed its sensitivity in concrete with $CO_2$. These mixes proved that lower lime percentage of 1% and 2% were optimal for high $CO_2$ content of 60 g/L and 80 g/L (9.6 kg/m³) for later strength while it had less impact on early strength. Steel slag, on the other hand, had a significant impact on early strength while the 28-day strength also improved with an optimum dose of 5%. Therefore, steel slag addressed the early strength issues (1-day strength). The lab trials, therefore, deduce that $CO_2$ sequestering can not only make a positive environmental impact but can also enhance strength when combined with steel slag or other sequestering chemicals such as lime that is compatible with carbonation.

The invention claimed is:

1. A process for the preparation of a wet carbonated concrete mixture, the process comprising the steps of:
    dissolving and/or blending carbon dioxide into water to produce a $CO_2$-containing water comprising $CO_2$ gas bubbles; and
    mixing a concrete mixture with the $CO_2$-containing water to produce the wet carbonated concrete mixture;
    wherein the concrete mixture comprises a cementitious material, aggregates and at least one $CO_2$-sequestering chemical that releases species which are ready to be carbonated via the $CO_2$-containing water, thereby increasing the captured amount of $CO_2$ in the wet carbonated concrete mixture; and
    wherein the water is carried in a feed line at a water flow rate, and dissolving and/or blending carbon dioxide into the water comprises injecting the carbon dioxide into the feed line carrying the water and adjusting the water flow rate and a $CO_2$ injection flow rate to deliver at least 1 kg of $CO_2$ per m³ of wet concrete mixture.

2. The process of claim 1, wherein the cementitious material comprises cement, supplementary cementitious materials (SCMs) or a mixture thereof.

3. The process of claim 2, wherein the SCMs comprise fly ash, ground granulated blast furnace slag (GGBFS), silica fume, siliceous material, aluminosilicate material, calcined clay, metakaolin, ground glass or any combination thereof.

4. The process of claim 1, wherein the aggregates comprise sand, gravel, crushed stone or any combinations thereof.

5. The process of claim 1, wherein the mixing of the concrete mixture with the $CO_2$-containing water is performed with a $CO_2$-containing water to total cementitious material weight ratio between 0.15 and 2.0.

6. The process of claim 1, wherein the $CO_2$-containing water has a $CO_2$ to water ratio between 5 g/L and 200 g/L.

7. The process of claim 1, wherein injecting carbon dioxide into the feed line carrying the water comprises injecting the carbon dioxide in at least one of a gas phase and a liquid phase.

8. The process of claim 1, wherein the water flow rate ranges between 300 kg/minute and 1800 kg/minute, and the $CO_2$ injection flow rate ranges between 1 kg/minute and 40 kg/minute of $CO_2$ per min.

9. The process of claim 1, comprising providing the $CO_2$-containing water and the concrete mixture in batched amounts to form a pre-mix composition before mixing thereof to produce the wet concrete mixture.

10. The process of claim 1, further comprising conditioning the wet carbonated concrete mixture by batching the wet carbonated concrete mixture in a batched amount to form a batched ready-mix composition.

11. The process of claim 1, wherein the $CO_2$-containing water further comprises at least one of nanosized alkaline earth metal carbonate particles or nanosized alkali metal carbonate particles.

12. The process of claim 1, wherein a weight ratio of the at least one $CO_2$-sequestering chemical to the cementitious material is between 0.5% and 10%.

13. The process of claim 1, wherein the at least one $CO_2$-sequestering chemical is under the form of ground or fine particles that comprise at least one alkali metal compound, at least one alkaline earth metal compound or a combination thereof, and that generate carbonate particles which densify a concrete microstructure upon carbonation of the at least one $CO_2$-sequestering chemical.

14. A process for the preparation of a carbonated concrete material, the process comprising the steps of:
dissolving and/or blending carbon dioxide into water to produce a $CO_2$-containing water comprising $CO_2$ gas bubbles;
mixing a concrete mixture with the $CO_2$-containing water to produce a wet carbonated concrete mixture; and
allowing the wet carbonated concrete mixture to harden and produce the carbonated concrete material upon hydration and carbonation thereof;
wherein the concrete mixture comprises a cementitious material, aggregates and at least one $CO_2$-sequestering chemical that releases species which are ready to be carbonated via the $CO_2$-containing water, thereby increasing the captured amount of $CO_2$ in the carbonated concrete material; and
wherein the water is carried in a feed line at a water flow rate, and dissolving and/or blending carbon dioxide into the water comprises injecting the carbon dioxide into the feed line carrying the water and adjusting the water flow rate and a $CO_2$ injection speed to deliver at least 1 kg of $CO_2$ per $m^3$ of wet concrete mixture.

15. The process of claim 14, wherein allowing the wet carbonated concrete mixture to harden comprises conditioning the wet carbonated concrete mixture to produce a ready-to-cure concrete.

16. The process of claim 15, wherein the conditioning of the wet carbonated concrete mixture comprises at least one of batching, transiting, depositing, forming, consolidating, and finishing the wet concrete mixture.

17. The process of claim 14, wherein the at least one $CO_2$-sequestering chemical is under the form of ground or fine particles that comprise at least one alkali metal compound, at least one alkaline earth metal compound or a combination thereof, and that generate carbonate particles which densify a concrete microstructure upon carbonation of the at least one $CO_2$-sequestering chemical.

* * * * *